US012561647B1

(12) United States Patent
Ma et al.

(10) Patent No.: US 12,561,647 B1
(45) Date of Patent: Feb. 24, 2026

(54) MACHINE LEARNING MODELS FOR GENERATION OF EXECUTION ACTION DATA STRUCTURES BASED ON DEVICE DELIVERY LATENCY

(71) Applicant: U.S. Bancorp, National Association, Minneapolis, MN (US)

(72) Inventors: Ding Ma, Thousand Oaks, CA (US); Xiaoqiao Wei, Rancho Mission Viejo, CA (US); Paramjit Chumber, Moorpark, CA (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/282,692

(22) Filed: Jul. 28, 2025

(51) Int. Cl.
| | |
|---|---|
| *G06Q 10/087* | (2023.01) |
| *G06N 20/00* | (2019.01) |
| *G06Q 30/0202* | (2023.01) |

(52) U.S. Cl.
CPC ....... *G06Q 10/08726* (2025.08); *G06N 20/00* (2019.01); *G06Q 30/0202* (2013.01)

(58) Field of Classification Search
CPC ......... G06Q 10/08726; G06Q 30/0202; G06N 20/00
See application file for complete search history.

(56) References Cited

U.S. PATENT DOCUMENTS

| | | | | |
|---|---|---|---|---|
| 8,700,443 | B1 * | 4/2014 | Murray | G06Q 10/087 |
| | | | | 705/7.31 |
| 10,558,925 | B1 * | 2/2020 | Flor | G06N 3/0495 |
| 10,776,750 | B2 * | 9/2020 | Lindbo | G06Q 30/0621 |

(Continued)

FOREIGN PATENT DOCUMENTS

| | | | | | |
|---|---|---|---|---|---|
| CN | 118380120 | A | * | 7/2024 | G06N 3/0499 |
| CN | 119963242 | A | * | 5/2025 | |

(Continued)

OTHER PUBLICATIONS

Yosephine, Vina Sari, Marco Batara, and Marla Setiawati. "Scalable and Affordable IoT-Based Inventory Control with Real-Time Monitoring for Small and Medium Enterprises." Jurnal Teknik Industri (Surabaya) 27.1 (2025): 121-136. Web. (Year: 2025).*

(Continued)

*Primary Examiner* — Ashford S Hayles
(74) *Attorney, Agent, or Firm* — FOLEY & LARDNER LLP

(57) ABSTRACT
Systems and methods for autonomous device procurement are disclosed. A system can obtain point-of-sale (POS) terminal demand data and execute a machine-learning model to generate a forecasted inventory demand for POS terminal devices. The system can allocate the forecasted demand among devices based on ratios, simulate demand instances, calculate losses, and modify the allocated demand based on the losses. The system can generate a procurement plan based on the modified demand. The system may autonomously procure devices according to the plan. The forecasted demand may comprise a probabilistic distribution for multiple future time periods. The system may calculate a conditional value at risk (CVaR) based on the losses and generate the plan based on the CVaR.

18 Claims, 6 Drawing Sheets

(56) References Cited

U.S. PATENT DOCUMENTS

| | | | | |
|---|---|---|---|---|
| 10,783,442 | B1 * | 9/2020 | Torkkola | G06N 3/08 |
| 10,922,646 | B1 * | 2/2021 | Humair | G06Q 10/087 |
| 10,936,947 | B1 * | 3/2021 | Flunkert | G06F 17/18 |
| 11,120,361 | B1 * | 9/2021 | Januschowski | G06N 20/00 |
| 11,636,381 | B1 * | 4/2023 | Joseph | G06Q 30/0202 |
| | | | | 706/12 |
| 11,790,240 | B1 * | 10/2023 | Love | G06N 3/088 |
| | | | | 706/20 |
| 12,314,060 | B2 * | 5/2025 | Cella | G06Q 50/04 |
| 2007/0011053 | A1 * | 1/2007 | Yap | G06Q 20/203 |
| | | | | 705/22 |
| 2014/0122178 | A1 * | 5/2014 | Knight | G06Q 30/0202 |
| | | | | 705/7.31 |
| 2017/0262926 | A1 * | 9/2017 | High | G06K 7/10712 |
| 2017/0278053 | A1 * | 9/2017 | High | G06Q 10/087 |
| 2019/0139059 | A1 * | 5/2019 | Shiga | G06N 20/00 |
| 2019/0340543 | A1 * | 11/2019 | Gerenstein | G06Q 10/04 |
| 2019/0354920 | A1 * | 11/2019 | Farias | G06Q 10/087 |
| 2020/0126015 | A1 * | 4/2020 | Anandan Kartha | G06Q 10/087 |
| 2020/0184494 | A1 * | 6/2020 | Joseph | G06F 18/214 |
| 2020/0250609 | A1 * | 8/2020 | Ward | G06Q 30/0202 |
| 2021/0110429 | A1 * | 4/2021 | Keng | G06Q 30/0244 |
| 2021/0117896 | A1 * | 4/2021 | Koc | G06Q 10/06393 |
| 2021/0192412 | A1 * | 6/2021 | Krishnaswamy | |
| | | | | G06Q 10/06316 |
| 2021/0264332 | A1 * | 8/2021 | Pingali | G06N 3/04 |
| 2021/0304149 | A1 * | 9/2021 | Al-Sinan | G06Q 10/0639 |
| 2021/0334735 | A1 * | 10/2021 | Meszaros | G06Q 10/06 |
| 2021/0397941 | A1 * | 12/2021 | Zhu | G06N 3/09 |
| 2021/0398049 | A1 * | 12/2021 | Hrastar | G06Q 10/06315 |
| 2022/0245572 | A1 * | 8/2022 | Kamarchik | G06Q 30/0202 |
| 2022/0261712 | A1 * | 8/2022 | Stone | G06Q 10/0835 |
| 2022/0277331 | A1 * | 9/2022 | Nash | G06Q 30/0206 |
| 2022/0284278 | A1 * | 9/2022 | Tang | G06N 3/08 |
| 2022/0309363 | A1 * | 9/2022 | Rana | G06N 20/00 |
| 2022/0318711 | A1 * | 10/2022 | Recasens | G06Q 10/06315 |
| 2023/0101023 | A1 * | 3/2023 | Jin | G06Q 10/087 |
| | | | | 705/7.31 |
| 2023/0122754 | A1 * | 4/2023 | Cornejo Barriere | G06N 20/20 |
| | | | | 705/28 |
| 2023/0128417 | A1 * | 4/2023 | Awad Amar | G06Q 30/0202 |
| | | | | 705/7.34 |
| 2023/0245152 | A1 * | 8/2023 | Zhu | G06Q 30/0202 |
| | | | | 705/7.34 |
| 2024/0070529 | A1 * | 2/2024 | Wampler | G06Q 50/12 |
| 2024/0152862 | A1 * | 5/2024 | Maikhuri | G06Q 30/0205 |
| 2024/0161174 | A1 * | 5/2024 | Godfrey | G06Q 10/087 |
| 2024/0177022 | A1 * | 5/2024 | Mukherjee | G06N 20/00 |
| 2024/0177181 | A1 * | 5/2024 | Washizuka | G06Q 30/02 |
| 2024/0305658 | A1 * | 9/2024 | Nanduri | H04L 63/1433 |
| 2025/0053918 | A1 * | 2/2025 | Paul | G06Q 10/087 |
| 2025/0124461 | A1 * | 4/2025 | Saliminejad | G06Q 30/0202 |
| 2025/0225475 | A1 * | 7/2025 | Yeung | G06Q 10/06375 |

FOREIGN PATENT DOCUMENTS

| | | | | |
|---|---|---|---|---|
| DE | 202025100585 U1 * | 2/2025 | | G06Q 10/087 |
| IN | 202511025920 A * | 3/2025 | | |
| IN | 202511063863 A * | 7/2025 | | |
| KR | 102315898 B1 * | 10/2021 | | G06Q 10/10 |
| WO | WO-2019053821 A1 * | 3/2019 | | G06Q 30/06 |

OTHER PUBLICATIONS

Shahin, Mohammad et al. "Improving Operations through a Lean AI Paradigm: A View to an AI-Aided Lean Manufacturing via Versatile Convolutional Neural Network." International journal of advanced manufacturing technology 133.11-12 (2024): 5343-5419. Web. (Year: 2024).*

M. A. Al-Sinan and Z. Aljaroudi, "Autonomous Procurement System (APS): Pro Forma Development," 2020 International Conference on Artificial Intelligence & Modern Assistive Technology (ICAIMAT), Riyadh, Saudi Arabia, 2020, pp. 1-6 (Year: 2020).*

* cited by examiner

100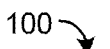

┌─────────────────────────────────────────────────┐ 102
│ 112                Autonomous Procurement Device   110 │
│  ┌──────────────┐        ┌──────────────┐         │
│  │  Processor   │        │   Network    │         │
│  │              │        │  Interface   │         │
│  └──────────────┘        └──────────────┘         │
│  ┌─────────────────────────────────────────────┐ │
│  │           Memory 114              116         │ │
│  │  ┌────────────────────────────────────────┐  │ │
│  │  │           Communicator                 │  │ │
│  │  └────────────────────────────────────────┘  │ │
│  │                                   118         │ │
│  │  ┌────────────────────────────────────────┐  │ │
│  │  │           Application                  │  │ │
│  │  │  120      122n   122b  122a            │  │ │
│  │  │ ┌──────────┐   ┌──────────────┐        │  │ │
│  │  │ │Application│   │   Machine    │        │  │ │
│  │  │ │ Manager  │   │Learning Model│        │  │ │
│  │  │ └──────────┘   └──────────────┘        │  │ │
│  │  │        124              126            │  │ │
│  │  │ ┌──────────┐   ┌──────────────┐        │  │ │
│  │  │ │  Action  │   │    Demand    │        │  │ │
│  │  │ │ Database │   │   Database   │        │  │ │
│  │  │ └──────────┘   └──────────────┘        │  │ │
│  │  └────────────────────────────────────────┘  │ │
│  └─────────────────────────────────────────────┘ │
└─────────────────────────────────────────────────┘

104
┌──────────────┐
│  Computing   │
│   Device     │
└──────────────┘

105
Network

106
┌──────────────┐
│  Computing   │
│   Device     │
└──────────────┘

FIG. 1

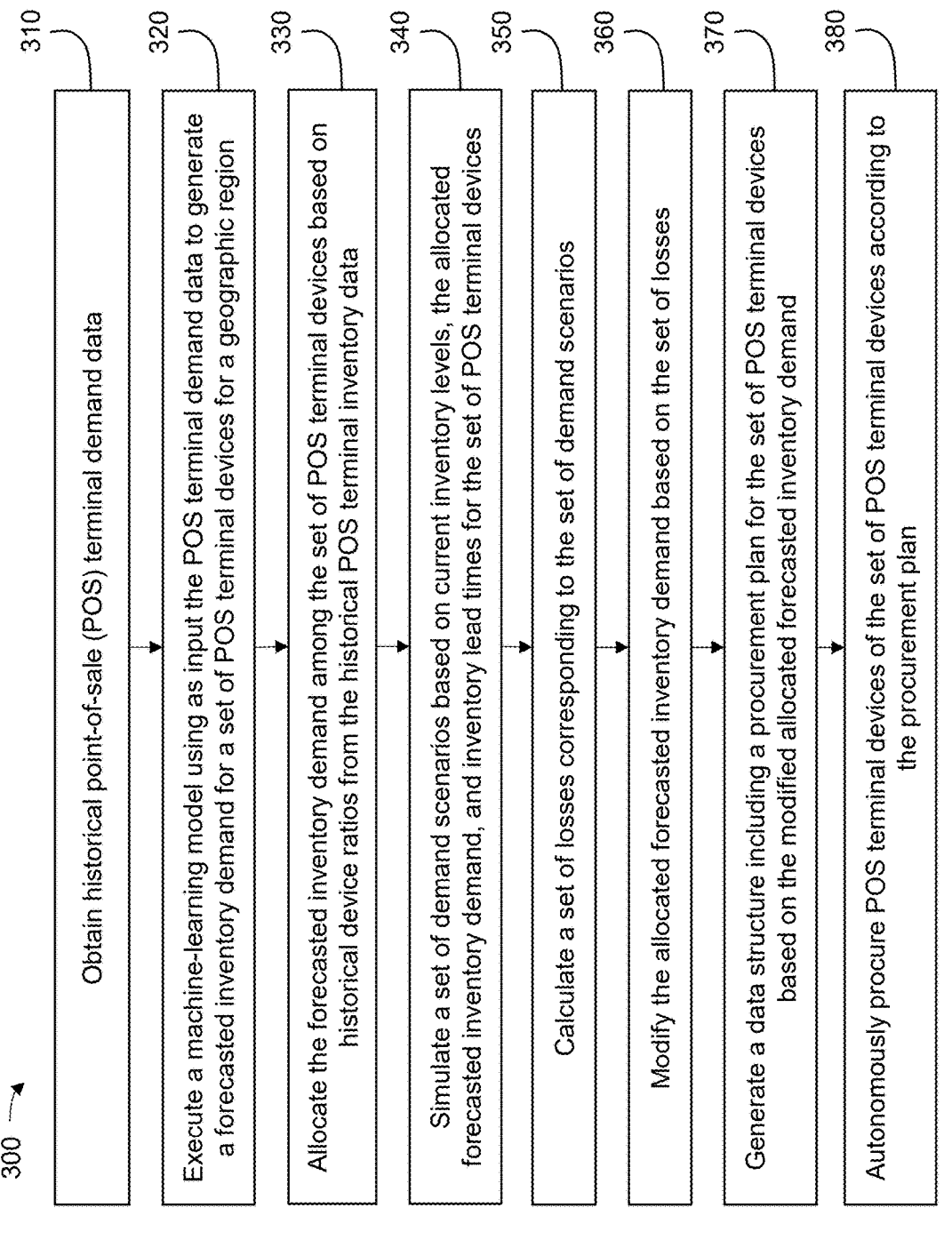

300

310 — Obtain historical point-of-sale (POS) terminal demand data

320 — Execute a machine-learning model using as input the POS terminal demand data to generate a forecasted inventory demand for a set of POS terminal devices for a geographic region 330 — Allocate the forecasted inventory demand among the set of POS terminal devices based on historical device ratios from the historical POS terminal inventory data 340 — Simulate a set of demand scenarios based on current inventory levels, the allocated forecasted inventory demand, and inventory lead times for the set of POS terminal devices 350 — Calculate a set of losses corresponding to the set of demand scenarios 360 — Modify the allocated forecasted inventory demand based on the set of losses 370 — Generate a data structure including a procurement plan for the set of POS terminal devices based on the modified allocated forecasted inventory demand 380 — Autonomously procure POS terminal devices of the set of POS terminal devices according to the procurement plan

MACHINE LEARNING MODELS FOR GENERATION OF EXECUTION ACTION DATA STRUCTURES BASED ON DEVICE DELIVERY LATENCY

BACKGROUND

Point-of-sale (POS) terminal devices are widely used in retail and service environments to process customer transactions and manage inventory. Efficient management of POS terminal device inventory is crucial for businesses to maintain smooth operations and meet customer demands. However, accurately forecasting demand and optimizing procurement for POS terminal devices across multiple locations can be challenging.

SUMMARY

At least one aspect of the present disclosure relates to a method. The method can be performed, for example, by one or more processors coupled to non-transitory memory. The method can include obtaining historical point-of-sale (POS) terminal demand data. The method can include executing a machine-learning model using as input the POS terminal demand data to generate a forecasted inventory demand for a set of POS terminal devices for a geographic region. The method can include allocating the forecasted inventory demand among the set of POS terminal devices based on historical device ratios from the historical POS terminal inventory data. The method can include simulating a set of demand instances based on current inventory levels, the allocated forecasted inventory demand, and inventory lead times for the set of POS terminal devices. The method can include calculating a set of losses corresponding to the set of demand instances. The method can include modifying the allocated forecasted inventory demand based on the set of losses. The method can include generating a data structure including a procurement plan for the set of POS terminal devices based on the modified allocated forecasted inventory demand.

In some implementations, the method can include autonomously procuring POS terminal devices of the set of POS terminal devices according to the procurement plan. In some implementations, the method can include obtaining raw data from multiple data sources. In some implementations, the method can include preprocessing the raw data to generate the historical POS terminal demand data. In some implementations, generating the data structure including the procurement plan for the set of POS terminal devices includes predicting future inventory levels based on the current inventory levels, the modified allocated forecasted inventory demand, and the inventory lead times.

In some implementations, the method can include obtaining training fulfillment times for the set of POS terminal devices. In some implementations, the method can include executing a delivery machine-learning model using as input the training fulfillment times for the set of POS terminal devices to generate predicted inventory lead times for the set of POS terminal devices. In some implementations, the method can include updating the delivery machine-learning model based on a loss between the predicted inventory lead times and actual inventory lead times. In some implementations, the method can include executing the delivery machine-learning model using as input historical fulfillment times to generate the inventory lead times for the set of POS terminal devices.

2

In some implementations, the method can include obtaining training POS terminal demand data for the set of POS terminal devices. In some implementations, the method can include executing the machine-learning model using as input the training POS terminal demand data for the set of POS terminal devices to generate a predicted inventory demand for the set of POS terminal devices for the geographic region. In some implementations, the method can include updating the machine-learning model based on a loss between the predicted inventory demand and actual inventory demand. In some implementations, the forecasted inventory demand comprises a probabilistic distribution. In some implementations, the forecasted inventory demand comprises forecasted inventory demands for a plurality of future time periods.

In some implementations, the method can include calculating a conditional value at risk (CVaR) based on the set of losses, and wherein generating the data structure is based on the calculated CVaR. In some implementations, calculating the set of losses corresponding to the set of demand instances includes calculating procurement shortfall losses based on budget limits and minimum service thresholds.

At least one other aspect of the present disclosure relates to a non-transitory, computer-readable medium. The non-transitory, computer-readable medium can include instructions which, when executed by one or more processors, cause the one or more processors to obtain historical point-of-sale (POS) terminal demand data. The instructions can cause the one or more processors to execute a machine-learning model using as input the POS terminal demand data to generate a forecasted inventory demand for a set of POS terminal devices for a geographic region. The instructions can cause the one or more processors to allocate the forecasted inventory demand among the set of POS terminal devices based on historical device ratios from the historical POS terminal inventory data. The instructions can cause the one or more processors to simulate a set of demand instances based on current inventory levels, the allocated forecasted inventory demand, and inventory lead times for the set of POS terminal devices. The instructions can cause the one or more processors to calculate a set of losses corresponding to the set of demand instances. The instructions can cause the one or more processors to modify the allocated forecasted inventory demand based on the set of losses. The instructions can cause the one or more processors to generate a data structure including a procurement plan for the set of POS terminal devices based on the modified allocated forecasted inventory demand.

In some implementations, the instructions can cause the one or more processors to autonomously procure POS terminal devices of the set of POS terminal devices according to the procurement plan. In some implementations, the instructions can cause the one or more processors to obtain raw data from multiple data sources. In some implementations, the instructions can cause the one or more processors to preprocess the raw data to generate the historical POS terminal demand data. In some implementations, the instructions can cause the one or more processors to generate the data structure including the procurement plan for the set of POS terminal devices by predicting future inventory levels based on the current inventory levels, the modified allocated forecasted inventory demand, and the inventory lead times.

In some implementations, the instructions can cause the one or more processors to obtain training fulfillment times for the set of POS terminal devices. In some implementations, the instructions can cause the one or more processors to execute a delivery machine-learning model using as input the training fulfillment times for the set of POS terminal devices to generate predicted inventory lead times for the set of POS terminal devices. In some implementations, the instructions can cause the one or more processors to update the delivery machine-learning model based on a loss between the predicted inventory lead times and actual inventory lead times. In some implementations, the instructions can cause the one or more processors to execute the delivery machine-learning model using as input historical fulfillment times to generate the inventory lead times for the set of POS terminal devices.

In some implementations, the instructions can cause the one or more processors to obtain training POS terminal demand data for the set of POS terminal devices. In some implementations, the instructions can cause the one or more processors to execute the machine-learning model using as input the training POS terminal demand data for the set of POS terminal devices to generate a predicted inventory demand for the set of POS terminal devices for the geographic region. In some implementations, the instructions can cause the one or more processors to update the machine-learning model based on a loss between the predicted inventory demand and actual inventory demand. In some implementations, the forecasted inventory demand comprises a probabilistic distribution. In some implementations, the forecasted inventory demand comprises forecasted inventory demands for a plurality of future time periods.

In some implementations, the instructions can cause the one or more processors to calculate a conditional value at risk (CVaR) based on the set of losses, and wherein the instructions cause the one or more processors to generate the data structure based on the calculated CVaR. In some implementations, the instructions can cause the one or more processors to calculate the set of losses corresponding to the set of demand instances by calculating procurement shortfall losses based on budget limits and minimum service thresholds.

In an example, there is a system that includes a first set of terminal devices in a first geographic location comprising a first plurality of terminal devices of a first device type and a second plurality of terminal devices of a second device type and a second set of terminal devices in a second geographic location comprising a third plurality of terminal devices of a first device type and a fourth plurality of terminal devices of a second device type. The terminal devices are allocated between the first set in the first geographic location and the second set in the second geographic location as a result of a process comprising: obtaining terminal device demand data; executing a machine-learning model using as input the terminal device demand data to generate a demand prediction for a set of terminal devices for the first geographic location or the second geographic location; allocating the demand prediction among the set of terminal devices based on device ratios from the terminal device demand data; simulating a set of demand instances based on current terminal device levels in the first geographic location and the second geographic location, the allocated demand prediction, and delivery latency for the set of terminal devices; calculating a set of losses corresponding to the set of demand instances; modifying the allocated demand prediction based on the set of losses; generating a data structure including an execution action data structure for the set of terminal devices based on the modified allocated demand prediction; and physically allocating the terminal devices between the first geographic location and the second geographic location according to the execution action data structure.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF FIGURES

The accompanying drawings are not intended to be drawn to scale. Like reference numbers and designations in the various drawings indicate like elements. For purposes of clarity, not every component may be labeled in every drawing. In the drawings:

FIG. 1 illustrates an example system for autonomous device procurement, in accordance with an implementation;

FIG. 3 illustrates an example method for autonomous device procurement, in accordance with an implementation;

FIG. 5 illustrates an example machine learning framework that techniques described herein may benefit from.

DETAILED DESCRIPTION

Figure 2A:
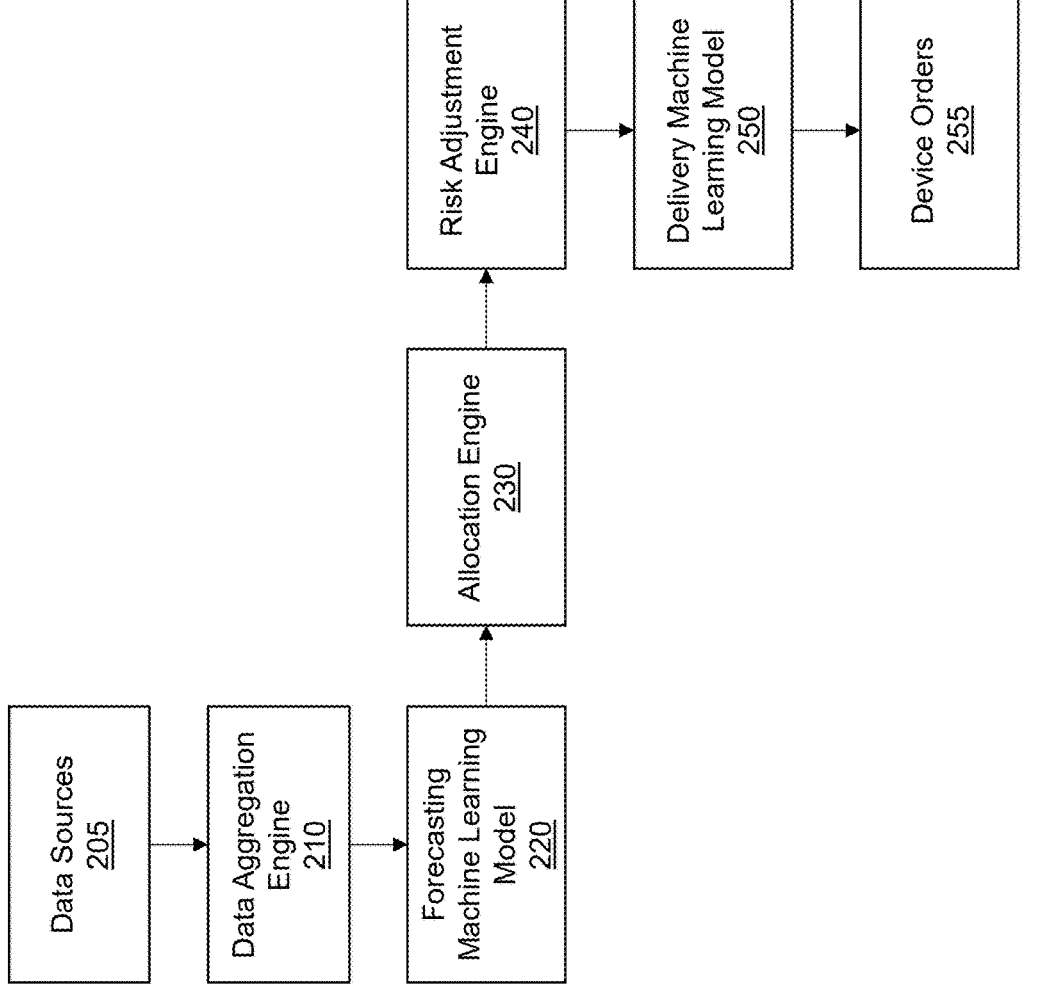
FIG. 2A illustrates a block diagram of an example system for autonomous device procurement, in accordance with an implementation.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

The techniques described herein relate to autonomous device procurement systems that can optimize inventory management for point-of-sale (POS) terminal devices across geographic regions. POS terminal devices can be used in retail environments to process customer transactions and manage inventory. Efficient management of POS terminal device inventory can help businesses maintain smooth operations and meet customer demands. Inventory management systems can use annual average demand to predict future inventory needs.

However, conventional inventory management approaches for POS terminal devices can have limitations. Static buffer levels and annual average historical usage data may not adequately account for demand volatility or regional variations. Reactive procurement strategies based solely on past trends can lead to overstocking in some areas while understocking in others. Additionally, traditional methods may not sufficiently factor in supply chain disruptions, lead times, or other operational constraints. These limitations can result in inefficient capital allocation, stock shortages, and reduced business continuity.

The techniques described herein can provide an autonomous device procurement system that uses machine learning and risk-based optimization to improve POS terminal inventory management. The system can obtain historical POS terminal demand data from multiple sources and preprocess the data to generate a consolidated dataset. A machine learning forecasting model can use the historical data to generate probabilistic demand forecasts for POS terminal devices across geographic regions.

The system can allocate the forecasted demand among different POS terminal device types based on historical device ratios. This two-stage approach—first generating aggregate forecasts at the geographic region level and then allocating to specific device types—provides greater efficiency and accuracy than attempting to forecast demand for each device type individually. By forecasting at a higher geographic level, the system leverages more stable aggregate patterns that are less susceptible to device-specific volatility. For example, the system might forecast that a particular country will require 5,000 POS terminals in the next quarter, and then use historical device ratios to determine that 60% should be countertop terminals (3,000 units), 25% should be mobile terminals (1,250 units), and 15% should be integrated terminals (750 units). This approach reduces computational complexity while maintaining forecast accuracy, as the historical ratios capture established device mix patterns that tend to remain relatively stable even when overall demand fluctuates.

A set of demand instances can be simulated using the allocated forecasts, current inventory levels, and device-specific lead times. The system can calculate potential losses for each simulated instance based on procurement costs, stockout penalties, and other relevant factors. The allocated demand forecasts can be modified based on the calculated losses to reduce overall risk. A conditional value at risk (CVaR) metric can be computed to quantify the expected losses in adverse instances. The system can generate a data structure containing a procurement plan that specifies the quantities and timing of POS terminal device orders across locations. In some implementations, the system can autonomously execute procurement actions according to the generated plan.

The techniques described herein can provide technical improvements over conventional inventory management approaches. By using machine learning forecasting and risk-based optimization, the system can generate more accurate and robust procurement plans that account for demand uncertainty and operational constraints. The probabilistic forecasts and instance simulations can enable better preparedness for volatile demand patterns and supply chain disruptions. The CVaR-based optimization can reduce the impact of worst-case instances while balancing inventory costs. The autonomous procurement capabilities can increase operational efficiency by reducing manual planning efforts. Overall, the techniques can enable more data-driven and risk-aware inventory management for POS terminal devices across diverse geographic regions.

FIG. 1 illustrates an example autonomous procurement system 100 for point-of-sale (POS) terminal device procurement, in accordance with an implementation. While various embodiments and examples are provided for POS terminals, the discussion of autonomous procurement can apply to other inventory items. POS terminals may be an example of electronic devices that are managed by the system 100, and electronic devices may be an example of items that can be managed by the system 100. In brief overview, the autonomous procurement system 100 can include an autonomous procurement device 102, a computing device 104, a computing device 106, and a network 105. The autonomous procurement device 102, the computing device 104, and the computing device 106 can each include one or more aspects or features described elsewhere herein, such as in reference to the computing environment 400 of FIG. 4. The autonomous procurement device 102 can be configured to execute an application 118 stored locally on the autonomous procurement device 102 to forecast inventory demand for POS terminal devices across geographic regions and generate procurement plans. The autonomous procurement device 102 can execute machine-learning models 122a-n to analyze historical POS terminal demand data and predict future inventory needs. Using the forecasted demand and risk-based optimization, the autonomous procurement device 102 can improve the accuracy of the procurement plans for POS terminal devices. In doing so, the autonomous procurement device 102 can configure the machine-learning models 122a-n to handle complex relationships between demand patterns, lead times, and inventory levels when generating procurement plans. The autonomous procurement system 100 may include more, fewer, or different components than shown in FIG. 1.

The autonomous procurement device 102, the computing device 104, and the computing device 106 can include or execute on one or more processors 112 or computing devices and communicate via the network 105. The network 105 can include computer networks such as the Internet, local, wide, metro, or other area networks, intranets, satellite networks, and other communication networks, such as voice or data mobile telephone networks. The network 105 can be used to access information resources such as inventory databases, supplier systems, or procurement platforms that can be accessed, queried, or utilized by at least one computing device (e.g., the autonomous procurement device 102, the computing device 104, or the computing device 106), such as a laptop, desktop, tablet, personal digital assistant, smartphone, or portable computer.

The autonomous procurement device 102, the computing device 104, and the computing device 106 can include (e.g., each include) or utilize at least one processor 112 or other logic devices such as a programmable logic array engine or a module configured to communicate with one another or other resources or databases. As described herein, computers can be described as computers, computing devices, user devices, or client devices. The autonomous procurement device 102, the computing device 104, and the computing device 106 may each contain a processor 112 and memory 114. The components of the autonomous procurement device 102, the computing device 104, and the computing device 106 can be separate components or a single component. The autonomous procurement system 100 and its components can include hardware elements, such as one or more processors 112, logic devices, or circuits.

The autonomous procurement device 102, the computing device 104, and the computing device 106 can each be an electronic computing device (e.g., a server, a workstation, a laptop, a tablet, or any other type of computing device). The autonomous procurement device 102, the computing device 104, and the computing device 106 can each include a display with a graphical user interface, a keyboard, a touchscreen, or any other type of input/output device for monitoring and managing POS terminal device inventory.

Users can access the autonomous procurement system 100 through the autonomous procurement device 102, the computing device 104, or the computing device 106 to view inventory levels, forecasted demand, and procurement plans for POS terminal devices across geographic regions. In one example, a user of the autonomous procurement device 102 can provide an input into the autonomous procurement device 102 requesting a procurement plan for a specific geographic region. The autonomous procurement device 102 can execute the application 118 to retrieve historical POS terminal demand data from the demand database 126. The autonomous procurement device 102 can execute a machine-learning model 122a to generate a forecasted inventory demand for a set of POS terminal devices for the geographic region. The autonomous procurement device 102 can allocate the forecasted inventory demand among the set of POS terminal devices based on historical device ratios, simulate demand instances, calculate potential losses, and modify the allocated forecasted inventory demand based on the calculated losses. The autonomous procurement device 102 can then generate a data structure including a procurement plan for the set of POS terminal devices and present the procurement plan to the user.

The autonomous procurement device 102 can train multiple machine-learning models 122a-n (e.g., a neural network, a support vector machine, a random forest, etc.) to generate forecasted inventory demand for POS terminal devices, to generate risk adjustments, and/or to generate procurement plans based on forecasted demand. For example, the autonomous procurement device 102 can store and execute the application 118 that is configured to communicate with inventory management systems and supplier databases. The application 118 can be configured to access historical POS terminal demand data stored in the demand database 126. Through the application 118, the autonomous procurement device 102 can execute the machine-learning model 122a using historical demand data and current inventory levels to generate forecasted inventory demand for different types of POS terminal devices across geographic regions. The forecasted inventory demand can include probabilistic distributions for multiple future time periods. The autonomous procurement device 102 can allocate the forecasted inventory demand among different POS terminal device types based on historical device ratios from the historical POS terminal inventory data. The autonomous procurement device 102 can simulate a set of demand instances based on current inventory levels, the allocated forecasted inventory demand, and inventory lead times for the set of POS terminal devices. The autonomous procurement device 102 can calculate a set of losses corresponding to the set of demand instances and modify the allocated forecasted inventory demand based on the calculated losses. The autonomous procurement device 102 can adjust the parameters of the machine-learning model 122a based on the differences between predicted and actual demand over time to improve forecast accuracy.

The autonomous procurement device 102 can utilize multiple machine-learning models 122a-n for different aspects of the procurement process. For example, the autonomous procurement device 102 can use a forecasting machine-learning model 122a to predict aggregate demand at the geographic region level and a delivery machine-learning model 122b to predict inventory lead times for different POS terminal device types. The autonomous procurement device 102 can train the delivery machine-learning model 122b using historical fulfillment times to generate predicted inventory lead times for the set of POS terminal devices. The autonomous procurement device 102 can update the delivery machine-learning model 122b based on a loss between the predicted inventory lead times and actual inventory lead times. The autonomous procurement device 102 can transmit the machine-learning models 122a-n to other computing devices in the autonomous procurement system 100 to enable consistent forecasting and procurement planning across the organization.

The autonomous procurement device 102 may comprise one or more processors 112 that are configured to execute the machine-learning models 122a-n and generate procurement plans for POS terminal devices. The autonomous procurement device 102 may comprise a network interface 110, a processor 112, and memory 114. The autonomous procurement device 102 may communicate with the autonomous procurement device 102 and the computing device 106 via the network interface 110, which may be or include one or more antennas or other network device that enables communication across the network 105 and with other devices. The processor 112 may be or include an ASIC, one or more FPGAs, a DSP, circuits containing one or more processing components, circuitry for supporting a microprocessor, a group of processing components, or other suitable electronic processing components. In some implementations, the processor 112 may execute computer code or modules (e.g., executable code, object code, source code, script code, machine code, etc.) stored in memory 114 to facilitate the autonomous procurement activities described herein. The memory 114 may be any volatile or non-volatile computer-readable storage medium capable of storing data or computer code.

The memory 114 may include a communicator 116 and an application 118. The application 118 can include an application manager 120, machine-learning models 122a-n (individually machine-learning model 122, and, in groups, machine-learning models 122), an action database 124, and a demand database 126. In brief overview, the components 116-126 may obtain historical POS terminal demand data from multiple data sources, preprocess the data, and execute the machine-learning models 122a-n to generate forecasted inventory demand. The components 116-126 can allocate the forecasted demand among different POS terminal device types, simulate demand instances, calculate potential losses, and modify the allocated forecasted demand based on the calculated losses. The components 116-126 can generate a data structure including a procurement plan for the set of POS terminal devices and autonomously procure POS terminal devices according to the procurement plan. In this way, the components 116-126 can integrate multiple machine-learning models 122a-n to generate accurate procurement plans that account for demand uncertainty and operational constraints.

The action database 124 can be or include a relational database or a graphical database. The action database 124 can include procurement action data for POS terminal devices across geographic regions. The procurement actions can be actions performed by different departments or business units within an organization. The procurement action data can include, for individual procurement actions, an order quantity, a timestamp indicating the time and date in which the procurement action was performed or completed, identifications of the POS terminal device types ordered, the geographic region for which the devices were ordered, a procurement code, and any other data regarding the procurement actions. The action database 124 can store the procurement action data in records and data structures (e.g., tables).

The autonomous procurement device 102 can store data for procurement actions in the action database 124 over time. For example, the autonomous procurement device 102 can receive procurement action data from inventory management systems and supplier databases as procurement actions are processed and completed. Responsive to receiving the procurement action data, the autonomous procurement device 102 can store the procurement action data in the action database 124 in records for the individual procurement actions. The autonomous procurement device 102 can store the records in the data structures within the action database 124 for the geographic regions and POS terminal device types associated with the procurement actions. The autonomous procurement device 102 can generate and store such records for procurement actions as the autonomous procurement device 102 receives procurement action data over time. In some implementations, the action database 124 may include procurement action data for actions performed through the application 118 and actions performed through other procurement systems. In some implementations, the action database 124 is stored at a remote server, and the autonomous procurement device 102 requests procurement action data from the remote server to retrieve procurement action data.

The demand database 126 can be or include a relational or graphical database configured to store historical POS terminal demand data for different geographic regions and device types. The demand database 126 can store records (e.g., tables or data structures) for each geographic region that includes historical demand data. The historical demand data can include, for example, usage rates, deployment patterns, replacement cycles, seasonal variations, business growth indicators, and other factors affecting POS terminal device demand. Each record can include one or more field-value pairs that each correspond to a different type of data.

The communicator 116 may comprise programmable instructions that, upon execution, cause the processor 112 to communicate with the autonomous procurement device 102, the computing device 106, and any other computing device. The communicator 116 can be or include an application programming interface (API) that facilitates communication between the autonomous procurement device 102 (e.g., via the network interface 110 of the autonomous procurement device 102) and other computing devices. The communicator 116 may communicate with the computing device 104, the computing device 106, and any other computing devices across the network 105.

In one example, the communicator 116 can establish a connection with a computing device (e.g., the autonomous procurement device 102 or the computing device 106). The communicator 116 can establish the connection with the computing device over the network 105. To do so, the communicator 116 can communicate with the computing device across the network 105. In one example, the communicator 116 can transmit a syn packet to the computing device 106 (or vice versa) and establish the connection using a TLS handshaking protocol. The communicator 116 can use any handshaking protocol to establish a connection with the computing device 106. The autonomous procurement device 102 can communicate with the computing device 106 over the established connection.

The application 118 may comprise programmable instructions that, upon execution, cause the processor 112 to facilitate autonomous procurement of POS terminal devices. The application 118 can generate user interfaces with procurement plans and inventory forecasts and present the user interfaces on a display of the autonomous procurement device 102. In some implementations, the application 118 can use machine-learning models 122a-n to generate forecasted inventory demand, allocate the forecasted demand among different POS terminal device types, simulate demand instances, calculate potential losses, and modify the allocated forecasted demand based on the calculated losses. A user can review the generated procurement plan and approve or modify the plan, and the application 118 can autonomously procure POS terminal devices according to the approved procurement plan. The application 118 can transmit procurement orders to supplier systems and update inventory records in the demand database 126.

The application manager 120 of the application 118 can manage the execution of the machine-learning models 122a-n. The application manager 120 may comprise programmable instructions that, upon execution, cause the processor 112 to perform different operations using the application 118, such as training and executing the machine-learning models 122a-n to generate forecasted inventory demand and procurement plans. The application manager 120 can communicate or interact with supplier systems and inventory management systems to transmit procurement orders and receive inventory updates.

The application manager 120 can manage the machine-learning models 122a-n. In doing so, the application manager 120 can facilitate training and execution of the machine-learning models 122a-n. For example, the application manager 120 can obtain training POS terminal demand data for the set of POS terminal devices and execute the machine-learning model 122a using as input the training POS terminal demand data to generate a predicted inventory demand for the set of POS terminal devices for a geographic region. The application manager 120 can update the machine-learning model 122a based on a loss between the predicted inventory demand and actual inventory demand. The application manager 120 can also obtain training fulfillment times for the set of POS terminal devices and execute a delivery machine-learning model 122b using as input the training fulfillment times to generate predicted inventory lead times for the set of POS terminal devices. The application manager 120 can update the delivery machine-learning model 122b based on a loss between the predicted inventory lead times and actual inventory lead times. The application manager 120 can execute the delivery machine-learning model 122b using as input historical fulfillment times to generate the inventory lead times for the set of POS terminal devices.

In some implementations, the autonomous procurement device 102 can use machine-learning models 122a-n specialized for different types of POS terminal devices or geographic regions. For example, the autonomous procurement device 102 can train a machine-learning model 122a for forecasting demand for countertop POS terminals and a separate machine-learning model 122b for forecasting demand for mobile POS terminals. The autonomous procurement device 102 can select the appropriate machine-learning model 122a-n based on the type of POS terminal device or geographic region specified in a procurement planning request.

The application manager 120 can store the machine-learning models 122a-n in memory 114. In some implementations, the application manager 120 can store the machine-learning models 122a-n in memory 114 with indications of the types of POS terminal devices or geographic regions for which the machine-learning models 122a-n are configured to generate forecasts. The application manager 120 can manage any number of machine-learning models for different aspects of the procurement process, such as demand forecasting, lead time prediction, risk assessment, and inventory optimization.

The machine-learning models 122a-n may each be or include a neural network, a support vector machine, a random forest, a gradient boosting model, or any other type of machine-learning model. The machine-learning models 122a-n may be or include models that are each configured to perform specific tasks in the procurement process, such as demand forecasting, lead time prediction, risk assessment, and inventory optimization. The machine-learning models 122a-n may have been trained using historical POS terminal demand data, historical fulfillment times, and actual inventory demand to improve forecast accuracy and lead time predictions. The application manager 120 may continuously update and refine the machine-learning models 122a-n as new data becomes available.

The application manager 120 can integrate the outputs from multiple machine-learning models 122a-n to generate comprehensive procurement plans. For example, the application manager 120 can use outputs from the forecasting machine-learning model 122a and the delivery machine-learning model 122b to simulate demand instances and calculate potential losses. The application manager 120 may do so by combining the forecasted inventory demand from the forecasting machine-learning model 122a with the predicted inventory lead times from the delivery machine-learning model 122b. For instance, a user may select an option to generate a procurement plan for a specific geographic region. The application manager 120 can identify the selection and retrieve the appropriate machine-learning models 122a-n from memory 114. The application manager 120 may then use the forecasting machine-learning model 122a to generate a forecasted inventory demand and the delivery machine-learning model 122b to predict inventory lead times for the set of POS terminal devices.

The application manager 120 may use historical POS terminal demand data to train and execute the machine-learning models 122a-n. For example, the application manager 120 may generate a training data set that includes multiple instances of historical demand patterns, seasonal variations, business growth indicators, and other factors affecting POS terminal device demand. For each instance, the application manager 120 may input the historical data into the forecasting machine-learning model 122a to generate a predicted inventory demand. The application manager 120 can compare the predicted inventory demand to the actual inventory demand and update the forecasting machine-learning model 122a based on the difference. The application manager 120 may execute the forecasting machine-learning model 122a based on the input. The execution can cause the forecasting machine-learning model 122a to generate a forecasted inventory demand for a set of POS terminal devices for a geographic region.

The application manager 120 can allocate the forecasted inventory demand among the set of POS terminal devices based on historical device ratios from the historical POS terminal inventory data. For example, the application manager 120 can analyze the historical device ratios to determine the proportion of each POS terminal device type typically deployed in the geographic region. Based on the analysis, the application manager 120 can distribute the forecasted aggregate demand among different POS terminal device types. The application manager 120 can use back-propagation techniques on the forecasting machine-learning model 122a based on the differences between predicted and actual demand to adjust the weights and parameters of the forecasting machine-learning model 122a. In doing so, the application manager 120 can adjust the weights and parameters of the forecasting machine-learning model 122a such that the weights and parameters would cause the forecasting machine-learning model 122a to generate more accurate forecasts. The application manager 120 can train the forecasting machine-learning model 122a in this way for any number of historical data points. Accordingly, the application manager 120 can train the forecasting machine-learning model 122a to accommodate various demand patterns and seasonal variations. This method of training can enable the forecasting machine-learning model 122a to generate more accurate forecasts based on complex relationships between multiple factors affecting POS terminal device demand.

The application manager 120 may use the trained machine-learning models 122a-n to generate procurement plans for POS terminal devices. For example, a user can access the application 118 and select an option to generate a procurement plan for a specific geographic region. The user can provide an input (e.g., via an input/output device, such as a mouse, keyboard, or touch screen) specifying the geographic region and time period for the procurement plan. The application manager 120 can receive the input as a request for a procurement plan. Responsive to the request, the application manager 120 can retrieve the appropriate machine-learning models 122a-n from memory 114. The application manager 120 can execute the forecasting machine-learning model 122a using historical POS terminal demand data for the specified geographic region to generate a forecasted inventory demand.

To generate the procurement plan, the application manager 120 may retrieve current inventory levels and historical device ratios from the demand database 126. For example, responsive to the request for a procurement plan, the application manager 120 can query the demand database 126 for current inventory levels of POS terminal devices in the specified geographic region. In some implementations, the request can include specific POS terminal device types or other parameters. In such implementations, the application manager 120 can include the parameters in the query to the demand database 126.

For example, the application manager 120 may be configured to generate a user interface on the display of the autonomous procurement device 102. The user interface may be or include a set of options or elements that correspond to one or more different geographic regions, POS terminal device types, and time periods. A user accessing the autonomous procurement device 102 and the application 118 can select one of the options or elements for a geographic region. Responsive to the selection, the application manager 120 can query the demand database 126 for historical POS terminal demand data, current inventory levels, and historical device ratios for the selected geographic region. The application manager 120 can receive the data and use the data as input into the machine-learning models 122a-n to generate the procurement plan.

The application manager 120 may generate a feature vector to use as input into the forecasting machine-learning model 122*a* to generate the forecasted inventory demand. To do so, the application manager 120 may use historical POS terminal demand data for the specified geographic region. For example, the application manager 120 may query the demand database 126 to identify historical demand patterns, seasonal variations, business growth indicators, and other factors affecting POS terminal device demand in the geographic region. The application manager 120 may retrieve data for all identified factors, for a defined number of the most recent time periods, or for data within an immediately previous defined time period (e.g., the previous year). The application manager 120 can include the retrieved data in the feature vector. In another example, the application manager 120 may query the demand database 126 to identify current inventory levels, historical device ratios, and inventory lead times for the set of POS terminal devices in the geographic region. The application manager 120 can include the retrieved data in the feature vector. The application manager 120 can include any combination or permutation of such data in the feature vector. The application manager 120 can generate the feature vector with the data, in some implementations by normalizing the values or converting the values into a format compatible with the forecasting machine-learning model 122*a* (e.g., a numerical format using a table).

The application manager 120 can execute the forecasting machine-learning model 122*a* using the feature vector as input to generate a forecasted inventory demand for the set of POS terminal devices for the geographic region. The execution of the forecasting machine-learning model 122*a* can cause the forecasting machine-learning model 122*a* to generate a probabilistic distribution of demand for multiple future time periods. The application manager 120 can allocate the forecasted inventory demand among the set of POS terminal devices based on historical device ratios from the historical POS terminal inventory data. The application manager 120 can simulate a set of demand instances based on current inventory levels, the allocated forecasted inventory demand, and inventory lead times for the set of POS terminal devices. The application manager 120 can calculate a set of losses corresponding to the set of demand instances and modify the allocated forecasted inventory demand based on the set of losses. The application manager 120 can generate a data structure (e.g., a matrix, a table, file, user interface, notification, alert, data structure, etc.) including a procurement plan for the set of POS terminal devices based on the modified allocated forecasted inventory demand. The application manager 120 can present the data structure including the procurement plan on a display of the autonomous procurement device 102 to the user.

The application manager 120 can facilitate autonomous procurement of POS terminal devices according to the procurement plan. For example, responsive to receiving an approval of the procurement plan, the application manager 120 can transmit procurement orders to supplier systems for the quantities and types of POS terminal devices specified in the procurement plan. The procurement orders can include the identification of the geographic region, the quantities and types of POS terminal devices, and any other relevant procurement parameters. The supplier systems can receive the procurement orders and process the orders. The application manager 120 can update inventory records in the demand database 126 to reflect the pending orders. Thus, application manager 120 and the supplier systems can facilitate autonomous procurement of POS terminal devices according to the generated procurement plan.

The application manager 120 can update the machine-learning models 122*a*-*n* based on the actual inventory demand and lead times. For example, the application manager 120 can use back-propagation techniques on the forecasting machine-learning model 122*a* by comparing the actual inventory demand with the forecasted inventory demand and determining the difference. The application manager 120 can adjust the weights and parameters of the forecasting machine-learning model 122*a* based on the difference to train the forecasting machine-learning model 122*a* to generate more accurate forecasts. The application manager 120 can continue to update the machine-learning models 122*a*-*n* in this way over time based on new data to improve forecast accuracy and procurement planning. Thus, the application manager 120 can train the machine-learning models 122*a*-*n* to generate forecasts and procurement plans based on complex relationships between multiple factors affecting POS terminal device demand and supply.

In some implementations, the application manager 120 may use machine-learning models 122*a*-*n* that are specialized for specific types of POS terminal devices or geographic regions. For example, a user may provide an input into a user interface to generate a procurement plan for a specific type of POS terminal device or for a specific geographic region. The application manager 120 may identify the type of POS terminal device or geographic region from the input and retrieve a machine-learning model 122*a* from the machine-learning models 122*a*-*n* that is specialized for the specified type or region. The machine-learning model 122*a* may have been trained as described herein based on historical demand data for the specific type of POS terminal device or geographic region. The application manager 120 may include the type of POS terminal device or geographic region in a query to the demand database 126 and retrieve relevant historical data. The application manager 120 may execute the machine-learning model 122*a* to generate a forecasted inventory demand and produce a procurement plan as described herein. The application manager 120 may display the procurement plan on a user interface displayed on the autonomous procurement device 102. The user accessing the autonomous procurement device 102 may approve the procurement plan, and the application manager 120 may autonomously procure POS terminal devices according to the approved plan. By using machine-learning models 122*a*-*n* that are specialized for specific types of POS terminal devices or geographic regions, the autonomous procurement device 102 may further improve the accuracy of the forecasts and procurement plans that the application 118 generates.

In some implementations, the application manager 120 may train different machine-learning models 122*a*-*n* for different aspects of the procurement process. For example, the machine-learning model 122*a* can be configured to generate forecasted inventory demand and the machine-learning model 122*b* can be configured to predict inventory lead times. The application manager 120 can select which of the machine-learning models 122*a*-*n* to use based on the specific task (e.g., the application manager 120 can retrieve and use the machine-learning model 122*a* for demand forecasting and retrieve and use the machine-learning model 122*b* for lead time prediction). Each of the machine-learning models 122*a*-*n* may be configured to receive specific types of inputs relevant to the task. The application manager 120 can train each of the machine-learning models 122*a*-*n* based on the differences between predicted and actual values. For instance, for each forecasting task, the application manager 120 can execute the machine-learning model 122*a* to generate a forecasted inventory demand. The application manager 120 can later compare the forecasted inventory demand with the actual inventory demand and update the machine-learning model 122*a* based on the difference. The application manager 120 can train each of the machine-learning models 122*a-n* in this way over time to improve accuracy.

Furthermore, training the machine-learning models 122*a-n* in this way can enable the machine-learning models 122*a-n* to adapt to changing demand patterns and supply chain conditions. For instance, the machine-learning models 122*a-n* may have initially been trained on historical data from specific time periods or regions. Continuous training of the machine-learning models 122*a-n* based on new data can enable the machine-learning models 122*a-n* to adapt to new patterns and conditions (e.g., the learned relationships from one time period or region can provide new contextual information for forecasting in another time period or region). The machine-learning models 122*a-n* may be trained and configured to generate accurate forecasts and procurement plans for any type of POS terminal device or geographic region.

In some implementations, the application manager 120 can train the machine-learning models 122*a-n* to handle various demand patterns and supply chain conditions. Doing so can increase the generalization ability of the machine-learning models 122*a-n* to a group of POS terminal device types or geographic regions (e.g., not just individual types or regions) and adapt the machine-learning models 122*a-n* to changing conditions while maintaining or improving performance over time (e.g., avoiding model drift failures in which the performance degrades over time, such as due to changing economic conditions, supply chain disruptions, business growth, etc.). For example, the machine-learning models 122*a-n* can be trained according to one of the implementations described above. The autonomous procurement device 102 can share the trained machine-learning models 122*a-n* with other computing devices in the autonomous procurement system 100. Users accessing the other computing devices can further train the machine-learning models 122*a-n* based on local demand patterns and supply chain conditions. Because the training can occur over time, the machine-learning models 122*a-n* can account for changes in demand patterns and supply chain conditions (e.g., changes in economic conditions, supply chain disruptions, or business growth can influence POS terminal device demand and lead times). Accordingly, the machine-learning models 122*a-n* can be resistant to concept drift. Furthermore, by training the machine-learning models 122*a-n* in this way, the machine-learning models 122*a-n* can be useful when the distribution of demand patterns and supply chain conditions in a new geographic region differs from the patterns and conditions in the regions where the machine-learning models 122*a-n* were initially trained (e.g., the distribution of seasonal variations, business growth indicators, and lead times in the regions where the machine-learning models 122*a-n* were previously trained differ from the distribution in new regions). Thus, the autonomous procurement system 100 can adapt to covariate shift that may be present in changing and expanding business operations.

FIG. 2A illustrates a block diagram of an example system 200 for autonomous device procurement, in accordance with an implementation. The system 200 can include data sources 205, a data aggregation engine 210, a forecasting machine-learning model 220, an allocation engine 230, an adjustment engine 240, a delivery machine-learning model 250, and device orders 255. The data aggregation engine 210 can receive data from the data sources 205. The forecasting machine-learning model 220 can process data from the data aggregation engine 210. The allocation engine 230 can receive output from the forecasting machine-learning model 220. The risk adjustment engine 240 can process data from the allocation engine 230. The delivery machine-learning model 250 can receive input from the risk adjustment engine 240. The device orders 255 can be generated based on output from the delivery machine-learning model 250.

The system 200 can include components for autonomous device procurement and inventory management of point-of-sale (POS) terminal devices across geographic regions. The system 200 can process data from multiple sources to generate forecasts and procurement plans for different types of POS terminal devices. In some implementations, the system 200 can execute machine-learning models to analyze historical demand patterns and predict future inventory needs with probabilistic distributions. The system 200 can allocate forecasted demand among different device types based on historical device ratios, simulate various demand instances, and calculate potential losses for each instance. The system 200 can modify the allocated forecasts based on risk assessments and generate optimized procurement plans that balance inventory costs with service level requirements. In some implementations, the system 200 can autonomously execute procurement actions according to the generated plans, such as by transmitting orders to supplier systems, tracking fulfillment status, and updating inventory records.

The system 200 can be implemented as part of the autonomous procurement device 102 shown in FIG. 1. In some implementations, the components of the system 200 can correspond to modules or functions of the application 118 executed by the autonomous procurement device 102. For example, the data aggregation engine 210 can be a component of the application 118 that retrieves and processes data from the demand database 126. The forecasting machine-learning model 220 and the delivery machine-learning model 250 can be examples of the machine-learning models 122*a-n* stored in the memory 114 of the autonomous procurement device 102. The allocation engine 230 and the risk adjustment engine 240 can be implemented as functions of the application manager 120. The device orders 255 can represent the output generated by the application 118 and stored in the action database 124. By implementing the system 200 on the autonomous procurement device 102, the autonomous procurement system 100 can leverage the data processing and machine learning capabilities described in FIG. 2A to generate accurate procurement plans for POS terminal devices across different geographic regions.

The data sources 205 can provide historical POS terminal demand data and other relevant information for inventory management. The data sources 205 can include multiple databases, inventory management systems, supplier systems, or business intelligence platforms, among others, that store records of past POS terminal deployments, usage patterns, and replacement cycles across geographic regions. In some implementations, the data sources 205 can transmit raw data to the data aggregation engine 210 through application programming interfaces or scheduled data exports. For example, the data sources 205 can provide transaction logs showing when specific POS terminal devices were deployed to retail locations, maintenance records indicating when devices required replacement, or business growth metrics correlating with increased device demand. In some implementations, the data sources 205 can include external data feeds that provide contextual information affecting POS terminal demand, such as economic indicators, retail industry trends, or seasonal business patterns for specific geographic regions. The data sources 205 can be configured to update the historical data at regular intervals, such as daily, weekly, or monthly, to ensure the forecasting machine-learning model 220 has access to the most current information for generating accurate demand predictions.

The data aggregation engine 210 can obtain raw data from the data sources 205 and preprocess the raw data to generate consolidated historical POS terminal demand data. The data aggregation engine 210 can perform multiple preprocessing operations on the raw data, such as cleaning, normalizing, and transforming the data into a format suitable for machine learning analysis. In some implementations, the data aggregation engine 210 can employ an extract, transform, and load (ETL) pipeline to clean and enrich the raw data from the data sources 205 for modeling. For example, the ETL pipeline can remove duplicate entries, standardize date formats across different data sources, and impute missing values using statistical methods or machine learning techniques. The data aggregation engine 210 can further enrich the data by combining multiple data sources, such as merging transaction data with corresponding maintenance records and regional economic indicators, to create a comprehensive dataset for the forecasting machine-learning model 220. In some implementations, the data aggregation engine 210 can detect and remove outliers in the raw data that may represent anomalous demand patterns not reflective of normal business operations. For example, the data aggregation engine 210 can identify and filter out demand spikes caused by one-time promotional events or system errors in the data sources 205. In some implementations, the data aggregation engine 210 can merge data from disparate sources with different formats and structures into a unified dataset with consistent fields and metrics. For example, the data aggregation engine 210 can combine transaction logs from retail point-of-sale systems, inventory management records, and device deployment schedules from the data sources 205 to create a comprehensive historical demand profile for each geographic region and device type. The data aggregation engine 210 can also perform temporal aggregation to align data points from different time periods, such as converting daily transaction counts into weekly or monthly demand figures based on the forecasting requirements.

The forecasting machine-learning model 220 can execute using the historical POS terminal demand data as input to generate a forecasted inventory demand for a set of POS terminal devices for a geographic region. The forecasting machine-learning model 220 can incorporate lag features from previous time periods to capture temporal dependencies in the demand patterns, such as using demand values from 1, 3, 6, or 12 months prior as predictive variables. The forecasting machine-learning model 220 can account for seasonality by identifying recurring patterns at specific intervals, such as quarterly retail peaks or annual business cycles that affect POS terminal deployment. In some implementations, the forecasting machine-learning model 220 can integrate macroeconomic indicators as external variables, including retail sales indices, consumer spending metrics, or business formation rates that correlate with POS terminal demand across geographic regions. The forecasting machine-learning model 220 can generate forecast intervals with associated confidence scores for different time horizons, with confidence typically decreasing for more distant forecast periods. For example, the forecasting machine-learning model 220 can produce monthly demand forecasts for the next 12 months, where the confidence score for months 1-3 might be 90%, months 4-6 might be 80%, months 7-9 might be 70%, and months 10-12 might be 60%, reflecting the increasing uncertainty in longer-term predictions.

In some implementations, the forecasting machine-learning model 220 can be implemented as a gradient boosting model, such as XGBoost, LightGBM, or CatBoost, which can effectively capture non-linear relationships between historical demand patterns and future inventory needs. Other models that can be implemented as part of the forecasting machine-learning model 220 include ARIMA, Prophet, LSTM, and XGBoost. In an example, the forecasting machine-learning model 220 can generate a forecast interval of 5-8 months for a European geographic region, predicting that demand for mobile POS terminals will increase by 15-20% during months 6-7 due to seasonal retail patterns with a confidence score of 75%. In another example, the forecasting machine-learning model 220 can produce a forecast interval of 9-12 months for a North American geographic region, indicating that countertop POS terminal demand will decrease by 5-10% in months 10-12 due to technology transition patterns with a confidence score of 65%. The forecasting machine-learning model 220 can also be implemented as a recurrent neural network (RNN), long short-term memory (LSTM) network, or temporal convolutional network (TCN), which can effectively model sequential time-series data with complex temporal dependencies across multiple forecast intervals.

In some implementations, the forecasting machine-learning model 220 can generate a probabilistic distribution for the forecasted inventory demand. The probabilistic distribution can represent a range of possible demand values with associated probabilities rather than a single point estimate, allowing the system 200 to account for uncertainty in future demand patterns. The forecasting machine-learning model 220 can output the probabilistic distribution in various formats, such as a discrete probability mass function with demand quantities and corresponding probability values, or a continuous probability density function characterized by statistical parameters. In some implementations, the forecasting machine-learning model 220 can generate different types of probabilistic distributions based on the historical demand patterns for specific geographic regions. For example, the forecasting machine-learning model 220 can generate a normal distribution with calculated mean and standard deviation parameters for regions with stable demand patterns, or a skewed distribution with heavier tails for regions with more volatile or seasonal demand fluctuations. In an example, the forecasting machine-learning model 220 can generate a probabilistic distribution indicating that the demand for mobile POS terminals in a European region has a 60% probability of falling between 1,200 and 1,500 units, a 25% probability of exceeding 1,500 units, and a 15% probability of falling below 1,200 units for the upcoming quarter.

The forecasting machine-learning model 220 can output probabilistic distributions for different forecast intervals, such as months, to provide a comprehensive view of potential demand instances over time. In some implementations, the forecasting machine-learning model 220 can generate separate probability distributions for each month in the forecast horizon, allowing for more granular analysis of demand fluctuations. For example, the forecasting machine-learning model 220 can output a series of monthly distributions, where each distribution represents the range of possible demand values for a specific month, along with their associated probabilities. The forecasting machine-learning model 220 can adjust the parameters of these distributions based on factors such as seasonality, historical trends, and confidence levels that may vary across different time periods. In some cases, the forecasting machine-learning model 220 can produce cumulative probability distributions that show the likelihood of demand exceeding certain thresholds over multiple months, providing insights into long-term inventory planning and risk assessment.

In some implementations, the forecasting machine-learning model 220 can obtain training POS terminal demand data for the set of POS terminal devices and execute using the training data to generate a predicted inventory demand. The forecasting machine-learning model 220 can be trained through an iterative process where the model parameters are adjusted based on the difference between predicted and actual demand values. For example, the forecasting machine-learning model 220 can process historical demand data from the previous 24 months for mobile POS terminals in a European region, generate predictions for the subsequent 3 months, and compare the predictions with actual demand to calculate a loss function. In some implementations, the forecasting machine-learning model 220 can employ gradient descent techniques to minimize the loss function by adjusting internal weights and parameters. The forecasting machine-learning model 220 can incorporate various training techniques such as cross-validation, where the training data is divided into multiple subsets to evaluate model performance across different data segments. In an example, the forecasting machine-learning model 220 can use 80% of the historical POS terminal demand data for training and 20% for validation, with the validation set used to prevent overfitting by monitoring performance on unseen data. The forecasting machine-learning model 220 can also implement early stopping mechanisms that halt training when validation performance begins to degrade, thereby preserving generalization capabilities across different geographic regions and device types.

In some implementations, the forecasting machine-learning model 220 can be updated based on a loss between the predicted inventory demand and actual inventory demand. The forecasting machine-learning model 220 can undergo a supervised training process where the model parameters are adjusted to minimize the prediction error across multiple training examples. For example, the forecasting machine-learning model 220 can process historical demand data for mobile POS terminals in a European region from the previous 24 months, generate predictions for the subsequent 3 months, and compare the predictions with actual demand values to calculate a loss function such as mean squared error or mean absolute percentage error. The loss function can quantify the discrepancy between the predicted inventory demand and the actual inventory demand, with smaller values indicating better model performance. In some implementations, the forecasting machine-learning model 220 can employ gradient descent optimization techniques to iteratively adjust the model weights in the direction that reduces the loss function. In an example, the forecasting machine-learning model 220 can be trained on historical demand data for countertop POS terminals in a North American region, where the model initially predicts quarterly demand with a 15% error rate, and after multiple training iterations with backpropagation, the error rate decreases to 7%, demonstrating improved forecast accuracy. The forecasting machine-learning model 220 can incorporate cross-validation techniques during training, where the historical data is divided into multiple subsets to evaluate model performance across different time periods and prevent overfitting to specific demand patterns.

The forecasting machine-learning model 220 can generate country-level forecasts of device demand by aggregating and analyzing historical POS terminal data at a national scale. In some implementations, the forecasting machine-learning model 220 can process country-specific features such as GDP growth rates, national retail sales figures, or country-wide technology adoption trends to refine the demand predictions. The forecasting machine-learning model 220 can incorporate seasonal patterns unique to each country, such as major holiday shopping periods or fiscal year-end spikes in business equipment purchases. For example, the forecasting machine-learning model 220 can generate a country-level forecast for France predicting a 12% increase in mobile POS terminal demand during the third quarter, coinciding with the summer tourist season and increased outdoor dining activity. In another example, the forecasting machine-learning model 220 can produce a country-level forecast for Japan indicating a 20% surge in demand for contactless payment-enabled POS terminals in the months leading up to a major sporting event, reflecting anticipated changes in consumer payment preferences. The forecasting machine-learning model 220 can adjust the granularity of the country-level forecasts based on the size and diversity of the market, potentially generating separate forecasts for different regions or metropolitan areas within larger countries to capture localized demand variations.

The allocation engine 230 can allocate the forecasted inventory demand among the set of POS terminal devices based on historical device ratios from the historical POS terminal inventory data. The allocation engine 230 can calculate the historical device ratios by analyzing past procurement patterns and deployment distributions across different POS terminal device types within each geographic region. For example, the allocation engine 230 can compute a rolling average of the proportion of each device type ordered over the previous 12 months, such that if countertop terminals historically represented 65% of all POS devices deployed in a European region, mobile terminals represented 25%, and integrated terminals represented 10%, the allocation engine 230 can apply these percentages to distribute the forecasted aggregate demand among the specific device types. In some implementations, the allocation engine 230 can apply weighted averaging techniques that give greater importance to more recent historical data, such that device ratios from the most recent quarter might receive a weight of 0.5, the previous quarter a weight of 0.3, and earlier quarters a weight of 0.2, allowing the allocation engine 230 to account for gradual shifts in device type preferences while maintaining stability in the allocation process. The allocation engine 230 can store the calculated historical device ratios in a data structure that associates each geographic region with the corresponding distribution percentages for each POS terminal device type, enabling efficient retrieval and application of the ratios when processing new forecasted demand data.

The risk adjustment engine 240 can simulate a set of demand instances based on current inventory levels, the allocated forecasted inventory demand, and inventory lead times for the set of POS terminal devices. The risk adjustment engine 240 can generate multiple demand instances by applying stochastic simulation techniques to the allocated forecasted inventory demand, such as Monte Carlo simulations or bootstrapping methods that sample from the probabilistic distribution of the forecasted demand. In some implementations, the risk adjustment engine 240 can create instance trees that represent different possible demand trajectories over multiple time periods, with each branch of the tree corresponding to a specific demand realization. For example, the risk adjustment engine 240 can generate 1,000 simulated demand instances for mobile POS terminals in a European region, where each instance represents a possible monthly demand pattern over a 12-month horizon based on the probabilistic distribution provided by the forecasting machine-learning model 220. In another example, the risk adjustment engine 240 can simulate 500 demand instances for countertop POS terminals in a North American region, incorporating both the allocated forecasted demand and predicted lead times from the two model potential inventory shortfalls or excesses under different supply chain conditions. The risk adjustment engine 240 can store the simulated instances in a data structure that associates each instance with corresponding demand values, inventory positions, and timing parameters for subsequent loss calculation and risk assessment.

The delivery machine-learning model 250 can generate the predicted lead times for the set of POS terminal devices based on historical fulfillment data and current supply chain conditions. The predicted lead times can represent the expected duration between placing an order and receiving the inventory, which directly impacts when new stock becomes available for deployment. In some implementations, the delivery machine-learning model 250 can output a probabilistic distribution of lead times for each device type and geographic region, accounting for variability in shipping times, customs clearance processes, and supplier production schedules. For example, the delivery machine-learning model 250 can predict that mobile POS terminals ordered for a European region have a 70% probability of arriving within 4-6 weeks, a 20% probability of arriving within 3-4 weeks, and a 10% probability of taking more than 6 weeks to arrive. The lead time predictions can be used by the risk adjustment engine 240 to refine the demand instances and optimize the timing of procurement decisions. In another example, the delivery machine-learning model 250 can forecast that countertop POS terminals for a North American region typically have a lead time of 2-3 weeks, but due to a predicted supply chain disruption, the lead time for the next quarter may extend to 4-6 weeks with a 30% probability. By incorporating such lead time predictions, the system 200 can adjust procurement schedules to maintain adequate inventory levels and minimize the risk of stockouts or excess inventory.

The risk adjustment engine 240 can calculate a set of losses corresponding to the set of demand instances. The risk adjustment engine 240 can compute different types of losses for each simulated demand instance, such as stockout costs, excess inventory costs, or procurement costs that exceed budget constraints. In some implementations, the risk adjustment engine 240 can assign different weights to different types of losses based on business priorities and operational constraints. For example, the risk adjustment engine 240 can assign a higher weight to stockout losses for critical POS terminal devices that directly impact revenue generation compared to excess inventory losses for less critical device types. In some implementations, the risk adjustment engine 240 can calculate time-dependent losses that vary based on the duration and timing of inventory shortfalls. For example, the risk adjustment engine 240 can compute higher loss values for inventory shortages during peak business periods such as holiday shopping seasons or fiscal year-end periods compared to shortages during slower business periods. The risk adjustment engine 240 can store the calculated losses in a data structure that associates each simulated demand instance with corresponding loss values, enabling subsequent risk analysis and optimization of the procurement plan.

In some implementations, the risk adjustment engine 240 can calculate procurement shortfall losses based on budget limits and minimum service thresholds when calculating the set of losses. The risk adjustment engine 240 can compute the procurement shortfall losses by determining the difference between the required inventory levels needed to maintain minimum service thresholds and the actual inventory levels that can be achieved within the budget constraints. For example, the risk adjustment engine 240 can calculate that a European region requires at least 1,000 mobile POS terminals to maintain a 98% service level threshold, but the current budget limit allows for the procurement of only 850 units, resulting in a procurement shortfall loss equivalent to the cost of business disruption from the 150-unit deficit. In some implementations, the risk adjustment engine 240 can apply different weights to procurement shortfall losses based on the criticality of the geographic region or device type. For example, the risk adjustment engine 240 can assign a higher loss value to procurement shortfalls in high-revenue regions such as North America compared to lower-revenue regions, or apply a higher penalty factor to shortfalls in countertop POS terminals that process a majority of transactions compared to mobile POS terminals that serve as backups. The risk adjustment engine 240 can incorporate the calculated procurement shortfall losses into the overall set of losses used to modify the allocated forecasted inventory demand, such that the modified demand balances service level requirements with budget constraints across different geographic regions and device types.

In some implementations, the risk adjustment engine 240 can calculate a conditional value at risk (CVaR) based on the set of losses. The risk adjustment engine 240 can compute the CVaR by determining the expected loss in the worst-case instances, such as the average loss in the bottom 5% of all simulated demand instances. For example, the risk adjustment engine 240 can sort the calculated losses from all simulated instances in descending order, select the top 5% of instances with the highest loss values, and calculate the mean loss across these selected instances to generate the CVaR metric. In another example, the risk adjustment engine 240 can calculate a CVaR at a 95% confidence level for mobile POS terminals in a European region by computing the average loss across the 50 worst-performing instances out of 1,000 total simulated instances, resulting in a CVaR value that quantifies the expected loss under adverse conditions. The risk adjustment engine 240 can use the calculated CVaR as a risk measure to modify the allocated forecasted inventory demand, such that the modified demand reduces the expected losses in worst-case instances while maintaining acceptable inventory levels for normal operating conditions. The risk adjustment engine 240 can store the calculated CVaR values in a data structure that associates each geographic region and device type with corresponding risk metrics for subsequent use in generating the procurement plan. The risk adjustment engine 240 can use the calculated CVaR to provide a more robust assessment of potential losses compared to traditional risk measures. By focusing on the average loss in the worst-case instances, the CVaR can offer a more conservative and risk-averse approach to inventory management, which may be particularly valuable for POS terminal devices that are critical to business operations. In some implementations, the risk adjustment engine 240 can use the CVaR to adjust procurement strategies, such as increasing safety stock levels or accelerating order timelines for device types and regions with higher CVaR values, thereby potentially reducing the impact of extreme demand fluctuations or supply chain disruptions on overall inventory performance.

The risk adjustment engine 240 can modify the allocated forecasted inventory demand based on the set of losses and/or the CVaR. The risk adjustment engine 240 can apply adjustment factors to the allocated forecasted inventory demand for each POS terminal device type to reduce the expected losses in adverse instances. In some implementations, the risk adjustment engine 240 can increase the allocated forecasted inventory demand for device types with higher stockout costs or critical business impact, while decreasing the allocated forecasted inventory demand for device types with higher excess inventory costs. For example, the risk adjustment engine 240 can apply a 15% upward adjustment to the allocated forecasted demand for mobile POS terminals in a European region based on a high CVaR value indicating significant potential losses from stockouts during peak business periods. In another example, the risk adjustment engine 240 can reduce the allocated forecasted demand for countertop POS terminals in a North American region by 8% based on calculated losses showing excess inventory costs exceeding stockout costs in 70% of the simulated demand instances. The risk adjustment engine 240 can store the modified allocated forecasted inventory demand in a data structure that associates each geographic region and device type with corresponding adjusted demand values for subsequent use in generating the procurement plan.

The delivery machine-learning model 250 can generate a procurement plan for the set of POS terminal devices based on the modified allocated forecasted inventory demand. The delivery machine-learning model 250 can create a structured data representation that specifies the quantities, timing, and locations for ordering each type of POS terminal device in the set. In some implementations, the delivery machine-learning model 250 can format the procurement plan as a time-phased order schedule that distributes orders across multiple weeks or months to align with predicted demand patterns and lead times. For example, the delivery machine-learning model 250 can generate a procurement plan for mobile POS terminals in a European region that schedules 30% of the total modified allocated demand for immediate ordering, 40% for ordering in 30 days, and the remaining 30% for ordering in 60 days, based on the predicted inventory lead times and demand fluctuations. In another example, the delivery machine-learning model 250 can produce a procurement plan for countertop POS terminals in a North American region that includes specific order quantities for each of the next six months, with larger quantities scheduled during months preceding predicted seasonal demand increases. The delivery machine-learning model 250 can include metadata with each procurement plan entry, such as confidence scores, risk metrics, or budget impact assessments to support procurement decision-making.

In some implementations, the delivery machine-learning model 250 can predict future inventory levels based on the current inventory levels, the modified allocated forecasted inventory demand, and the inventory lead times when generating the procurement plan. The delivery machine-learning model 250 can analyze the current inventory levels for each POS terminal device type in the set and project how the levels will change over time as new orders arrive and existing inventory is deployed. For example, the delivery machine-learning model 250 can predict that mobile POS terminals in a European region will reach a critical threshold of 200 units in 45 days based on current inventory of 350 units, a modified allocated forecasted demand of 10 units per day, and an inventory lead time of 30 days for new orders. In another example, the delivery machine-learning model 250 can forecast that countertop POS terminals in a North American region will maintain sufficient inventory levels for the next 90 days based on current inventory of 500 units, a modified allocated forecasted demand of 120 units per month, and an inventory lead time of 21 days. The delivery machine-learning model 250 can incorporate the predicted future inventory levels into the data structure containing the procurement plan, such that the procurement plan specifies not only the quantities and timing of orders but also the projected inventory positions at different points in time. The delivery machine-learning model 250 can update the predicted future inventory levels as new data becomes available, allowing for dynamic adjustment of the procurement plan in response to changing demand patterns or supply chain conditions.

The delivery machine-learning model 250 can generate a data structure including the procurement plan. The data structure can be in a format for automatic execution of procurement actions. In some implementations, the delivery machine-learning model 250 can format the data structure as a structured JSON object with fields for device types, quantities, order dates, and delivery locations to enable direct integration with supplier ordering systems. The data structure can include metadata tags that specify procurement parameters such as budget codes, approval requirements, and fulfillment priorities for each device type in the procurement plan. For example, the delivery machine-learning model 250 can generate a data structure for mobile POS terminals in a European region that includes order quantities distributed across multiple months, with each entry containing supplier identifiers, pricing information, and delivery window specifications. In another example, the delivery machine-learning model 250 can produce a data structure for countertop POS terminals in a North American region that includes procurement timing recommendations based on predicted lead times, with fields for expedited shipping options and alternative supplier information in case primary suppliers cannot fulfill orders within required timeframes. The delivery machine-learning model 250 can update the data structure in response to changes in inventory levels, demand patterns, or supply chain conditions to maintain alignment between the procurement plan and current operational requirements.

In some implementations, the delivery machine-learning model 250 can autonomously procure POS terminal devices of the set of POS terminal devices according to the procurement plan. The delivery machine-learning model 250 can transmit electronic purchase orders to supplier systems without human intervention based on the quantities, timing, and specifications defined in the data structure containing the procurement plan. For example, the delivery machine-learning model 250 can generate API calls to supplier ordering systems with structured JSON payloads containing order details for mobile POS terminals in a European region, including quantity, delivery address, and requested fulfillment date. In another example, the delivery machine-learning model 250 can schedule recurring procurement actions for countertop POS terminals in a North American region based on the modified allocated forecasted inventory demand, such that orders are automatically placed when inventory levels are projected to reach predetermined thresholds. The delivery machine-learning model 250 can monitor order confirmations and shipping notifications from supplier systems to track the status of autonomous procurement actions and update inventory records in the demand database 126. The delivery machine-learning model 250 can adjust future procurement actions based on the actual lead times and fulfillment rates observed from previous autonomous procurement cycles, allowing for continuous refinement of the procurement process.

The device orders 255 can encompass various aspects of the procurement process generated by the delivery machine-learning model 250. In some implementations, the device orders 255 can include the procurement plan generated by the delivery machine-learning model 250, specifying the quantities, timing, and locations for ordering each type of POS terminal device. For example, the device orders 255 can contain a time-phased order schedule that distributes orders across multiple weeks or months, aligning with predicted demand patterns and lead times for different geographic regions. The device orders 255 can also incorporate the data structure created by the delivery machine-learning model 250, which may be formatted as a structured JSON object with fields for device types, quantities, order dates, and delivery locations. In some implementations, the device orders 255 can include metadata tags specifying procurement parameters such as budget codes, approval requirements, and fulfillment priorities for each device type. The device orders 255 can further encompass the autonomous procurement actions performed by the delivery machine-learning model 250, such as electronic purchase orders transmitted to supplier systems without human intervention. For example, the device orders 255 can include API calls generated by the delivery machine-learning model 250 to supplier ordering systems, containing structured JSON payloads with order details for specific POS terminal types in various regions. The device orders 255 can be dynamically updated by the delivery machine-learning model 250 in response to changes in inventory levels, demand patterns, or supply chain conditions, maintaining alignment between the procurement plan and current operational requirements.

As noted above, the delivery machine-learning model 250 can generate the predicted inventory lead times. In some implementations, a lead time machine-learning model separate from the delivery machine-learning model 250 generates the predicted inventory lead times. Actions, characteristics, and training methods described in conjunction with the delivery machine-learning model 250 can apply to the lead time machine-learning model. The delivery machine-learning model 250 can process historical fulfillment data from multiple suppliers and transportation providers to predict delivery timeframes for different POS terminal device types across geographic regions. For example, the delivery machine-learning model 250 can analyze past shipping records for mobile POS terminals in a European region and determine that orders from a specific supplier typically arrive within 4-6 weeks during normal conditions but may extend to 6-8 weeks during peak retail seasons. In another example, the delivery machine-learning model 250 can process customs clearance data for countertop POS terminals shipped to a North American region and predict that devices ordered from international suppliers will require 2-3 additional weeks for processing compared to devices from domestic suppliers. The delivery machine-learning model 250 can incorporate these predictions into the inventory planning process to optimize procurement timing and reduce the risk of stockouts.

The delivery machine-learning model 250 can obtain training fulfillment times for the set of POS terminal devices and execute using the training fulfillment times as input to generate predicted inventory lead times. The delivery machine-learning model 250 can process historical fulfillment data from multiple suppliers and logistics providers to learn patterns in delivery timeframes across different geographic regions and device types. In some implementations, the delivery machine-learning model 250 can incorporate seasonal variations in shipping times, such as longer lead times during peak retail periods or shorter lead times during business slowdowns. For example, the delivery machine-learning model 250 can analyze past fulfillment records for mobile POS terminals shipped to European regions and determine that orders typically arrive within 4-6 weeks during normal conditions but may extend to 6-8 weeks during holiday seasons. In another example, the delivery machine-learning model 250 can process customs clearance data for countertop POS terminals shipped to North American regions and predict that devices ordered from international suppliers will require 2-3 additional weeks for processing compared to devices from domestic suppliers. The delivery machine-learning model 250 can store the predicted lead times in a data structure that associates each POS terminal device type with corresponding lead time distributions for use in the demand instance simulations performed by the risk adjustment engine 240.

In some implementations, the delivery machine-learning model 250 can be updated based on a loss between the predicted inventory lead times and actual inventory lead times. The delivery machine-learning model 250 can undergo a supervised training process where the model parameters are adjusted to minimize the prediction error across multiple training examples. For example, the delivery machine-learning model 250 can process historical fulfillment data for mobile POS terminals in a European region from the previous 24 months, generate predictions for the subsequent 3 months, and compare the predictions with actual lead time values to calculate a loss function such as mean squared error or mean absolute percentage error. The loss function can quantify the discrepancy between the predicted inventory lead times and the actual inventory lead times, with smaller values indicating better model performance. In some implementations, the delivery machine-learning model 250 can employ gradient descent optimization techniques to iteratively adjust the model weights in the direction that reduces the loss function. In an example, the delivery machine-learning model 250 can be trained on historical fulfillment data for countertop POS terminals in a North American region, where the model initially predicts lead times with a 25% error rate, and after multiple training iterations with backpropagation, the error rate decreases to 10%, demonstrating improved lead time prediction accuracy. The delivery machine-learning model 250 can incorporate cross-validation techniques during training, where the historical fulfillment data is divided into multiple subsets to evaluate model performance across different time periods and prevent overfitting to specific lead time patterns.

Figure 2B:
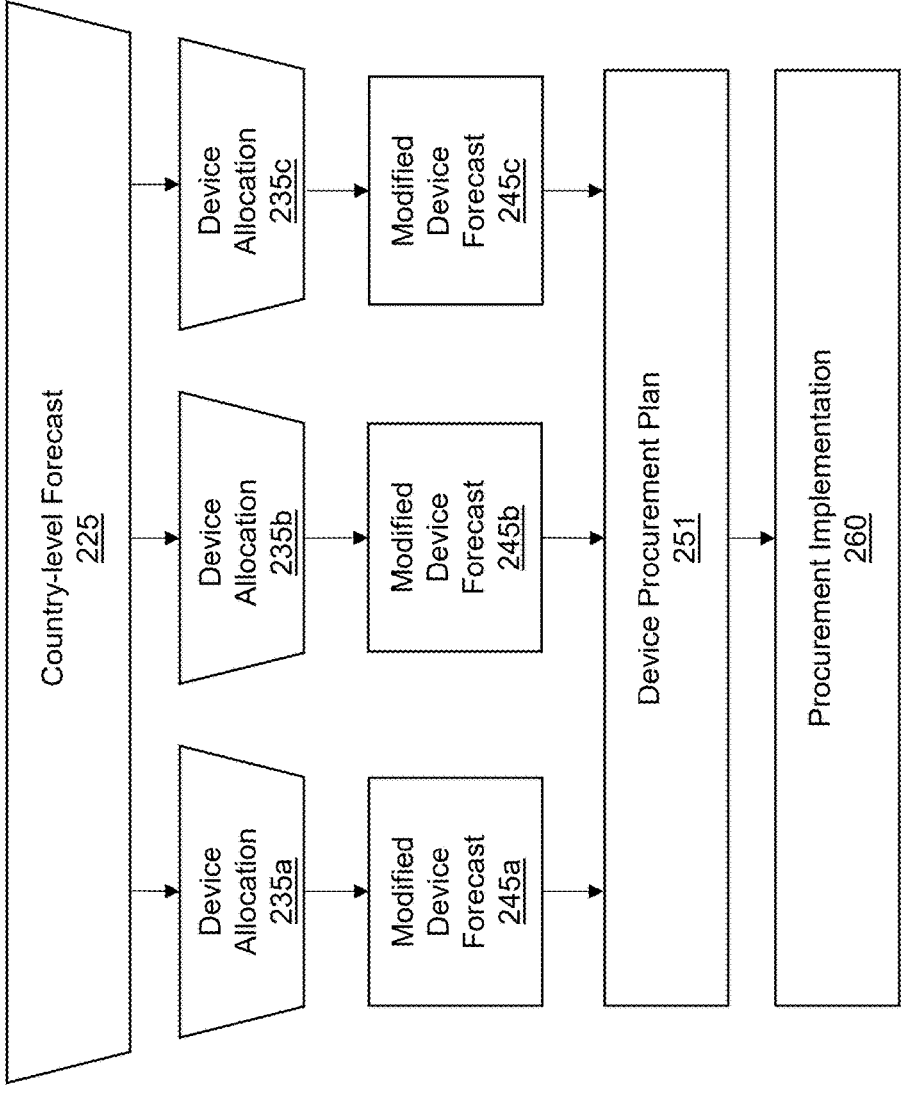
FIG. 2B illustrates a block diagram of an example data flow for autonomous device procurement, in accordance with an implementation.

FIG. 2B illustrates a block diagram of an example data flow 201 for autonomous device procurement, in accordance with an implementation. The data flow 201 can include a country-level forecast 225, a first device allocation 235a, a second device allocation 235b (referred to herein collectively as device allocations 235), a third device allocation 235c, a first modified device forecast 245a, a second modified device forecast 245b, a third modified device forecast 245c (referred to herein collectively as modified device forecasts 245), a device procurement plan 251, and a procurement implementation 260.

The data flow 201 can correspond to data generated by the system 200 shown in FIG. 2A. The country-level forecast 225 can be generated by the forecasting machine-learning model 220, which can process aggregated data to produce predictions for a geographic region. The device allocations 235 can be generated by the allocation engine 230, which can distribute the country-level forecast among different types of POS terminal devices based on historical device ratios. In some implementations, the modified device forecasts 245 can be generated by the risk adjustment engine 240, which can adjust the allocated forecasts based on simulated demand instances and calculated losses. The device procurement plan 251 can be generated by the delivery machine-learning model 250, which can create a structured procurement plan based on the modified device forecasts. The procurement implementation 260 can include automatic procurement actions performed by the delivery machine-learning model 250, such as transmitting electronic purchase orders to supplier systems or scheduling recurring procurement actions based on projected inventory levels. For example, the delivery machine-learning model 250 can generate API calls to supplier ordering systems with structured JSON payloads containing order details for specific POS terminal types in various regions, as part of the procurement implementation 260.

The country-level forecast 225 can provide an aggregate forecast for a geographic region (e.g., country). The country-level forecast 225 can include predicted demand values for all POS terminal devices within the geographic region without differentiating between specific device types. In some implementations, the country-level forecast 225 can incorporate seasonal patterns, economic indicators, and historical deployment trends to generate more accurate predictions for the geographic region. For example, the country-level forecast 225 can predict that a European country or region will require 5,000 total POS terminal devices in the upcoming quarter based on historical demand patterns and projected business growth. In another example, the country-level forecast 225 can generate a prediction that a North American country or region will experience a 15% increase in overall POS terminal device demand during the fourth quarter due to seasonal retail patterns. The country-level forecast 225 can be represented as a time series with monthly or quarterly values, or as a probabilistic distribution that captures the uncertainty in the aggregate demand prediction for the geographic region.

The device allocations 235 can distribute the country-level forecast 225 among different POS terminal device types. The device allocations 235 can apply the historical device ratios to the aggregate demand prediction from the country-level forecast 225 to determine specific quantities for each POS terminal device type. In some implementations, the device allocations 235 can incorporate weighted averaging techniques that give greater importance to more recent historical data when calculating the distribution percentages. For example, the device allocations 235 can distribute a country-level forecast 225 of 5,000 total POS terminal devices for a European region by allocating 60% to countertop terminals (3,000 units) in the first device allocation 235a, 25% to mobile terminals (1,250 units) in the second device allocation 235b, and 15% to integrated terminals (750 units) in the third device allocation 235c based on historical deployment patterns. In another example, the device allocations 235 can adjust the distribution percentages for a North American region based on seasonal factors, such that during holiday shopping periods the second device allocation 235b for mobile POS terminals receives a higher percentage of the country-level forecast 225 compared to non-peak periods. The device allocations 235 can distribute forecasted demand among specific stock keeping units (SKUs) within each POS terminal device type. In some implementations, the allocation engine 230 can analyze historical sales data and inventory records to determine the relative popularity of different SKUs, such as specific models or configurations of countertop, mobile, or integrated POS terminals. For example, the first device allocation 235a for countertop terminals can be subdivided into separate allocations for high-end models with advanced features, mid-range models for standard retail environments, and entry-level models for small businesses, based on historical demand patterns and current market trends for each SKU.

The modified device forecasts 245 can adjust the device allocations 235 based on risk assessments and other factors. The modified device forecasts 245 can incorporate adjustments derived from the calculated losses and risk metrics to optimize inventory levels across different POS terminal device types. In some implementations, the modified device forecasts 245 can increase or decrease the allocated quantities from the device allocations 235 based on the conditional value at risk (CVaR) calculated by the risk adjustment engine 240. For example, the first modified device forecast 245a for countertop POS terminals can apply a 15% upward adjustment to the first device allocation 235a based on a high CVaR value indicating significant potential losses from stockouts during peak business periods. In another example, the second modified device forecast 245b for mobile POS terminals can reduce the second device allocation 235b by 8% based on calculated losses showing excess inventory costs exceeding stockout costs in 70% of the simulated demand instances.

The device procurement plan 251 can specify the quantities and timing of POS terminal device orders based on the modified device forecasts 245. The device procurement plan 251 can include a structured schedule that distributes procurement actions across multiple time periods to align with predicted demand patterns and inventory lead times. In some implementations, the device procurement plan 251 can incorporate budget constraints and service level requirements when determining order quantities for each POS terminal device type. For example, the device procurement plan 251 can specify that 500 mobile POS terminals should be ordered immediately for a European region, followed by 300 additional units in 45 days, based on the first modified device forecast 245a indicating a gradual increase in demand over the next quarter. In another example, the device procurement plan 251 can recommend ordering 1,200 countertop POS terminals for a North American region in three separate batches of 400 units each, spaced 30 days apart, based on the second modified device forecast 245b and predicted lead times of 21 days. The device procurement plan 251 can include metadata for each planned order, such as supplier information, shipping preferences, or priority levels to facilitate the procurement implementation 260.

The procurement implementation 260 can include procurement actions according to the device procurement plan 251. The procurement implementation 260 can involve human operators executing procurement tasks specified in the device procurement plan 251, such as manually placing orders with suppliers, scheduling deliveries, or approving purchase requisitions through a procurement system. In some implementations, the procurement implementation

260 can be performed autonomously without human intervention, with the delivery machine-learning model 250 transmitting electronic purchase orders directly to supplier systems based on the quantities and timing specified in the device procurement plan 251. For example, the procurement implementation 260 can include the delivery machine-learning model 250 generating API calls to supplier ordering systems with structured JSON payloads containing order details for mobile POS terminals in a European region, including quantity, delivery address, and requested fulfillment date. In another example, the procurement implementation 260 can include scheduling recurring procurement actions for countertop POS terminals in a North American region based on the modified allocated forecasted inventory demand, such that orders are automatically placed when inventory levels are projected to reach predetermined thresholds. The procurement implementation 260 can also include monitoring order confirmations and shipping notifications from supplier systems to track the status of procurement actions and update inventory records in the demand database 126.

FIG. 3 illustrates an example method 300 for autonomous device procurement, in accordance with an implementation. The method 300 can include more, fewer, or different operations than shown. One or more operations can be performed in the order shown, in a different order, and/or concurrently. The method 300 may be performed by the system 200 of FIG. 2A and may implement the data flow 201 of FIG. 2B.

At operation 310, historical point-of-sale (POS) terminal demand data can be obtained. The historical POS terminal demand data may be retrieved from multiple data sources, such as transaction logs, inventory management systems, or business intelligence platforms. In some implementations, the historical POS terminal demand data can include usage rates, deployment patterns, replacement cycles, and seasonal variations for different types of POS terminal devices across various geographic regions. For example, the historical data may include monthly sales figures for mobile POS terminals in European countries over the past 24 months. In another example, the historical data may comprise quarterly deployment records for countertop POS terminals in North American retail chains for the previous 3 years.

In some implementations, the method can include obtaining raw data from multiple data sources and preprocessing the raw data to generate the historical POS terminal demand data. The raw data can be collected from various sources such as transaction logs, inventory management systems, supplier databases, or business intelligence platforms, among others. The preprocessing of the raw data can involve multiple steps to clean, normalize, and transform the data into a format suitable for analysis and forecasting. For example, the preprocessing can include removing duplicate entries, standardizing date formats across different data sources, and aggregating transaction-level data into daily or weekly demand figures. In some implementations, the preprocessing can also involve data enrichment by combining multiple data sources, such as merging transaction data with corresponding maintenance records and regional economic indicators. The preprocessing can further include detecting and removing outliers that may represent anomalous demand patterns not reflective of normal business operations. For instance, the preprocessing can identify and filter out demand spikes caused by one-time promotional events or system errors in the data sources. The resulting historical POS terminal demand data can provide a comprehensive and consistent dataset for use in subsequent forecasting and allocation operations.

As discussed herein, while various examples and embodiments are described as relating to POS terminals, other inventory items can be managed using the method 300. In an example, the method 300 is performed to manage inventory for various electronic devices. In an example, the method 300 is performed to manage inventory for raw materials.

At operation 320, a machine-learning model can be executed using the POS terminal demand data as input to generate a forecasted inventory demand (also referred to herein as a demand prediction) for a set of POS terminal devices for a geographic region. The machine-learning model may be trained on historical demand patterns to predict future inventory needs. In some implementations, the forecasted inventory demand can be represented as a probabilistic distribution, capturing the uncertainty in future demand predictions. For example, the machine-learning model may generate a forecast indicating a 60% probability that demand for mobile POS terminals in a European region will fall between 1,200 and 1,500 units for the upcoming quarter. In another example, the model may produce a time series forecast predicting monthly demand for countertop POS terminals in a North American region over the next 12 months, with confidence intervals for each prediction.

The machine-learning model can be trained to generate the forecasted inventory demand using historical POS terminal demand data. In some implementations, the machine-learning model can obtain training POS terminal demand data for the set of POS terminal devices and execute using the training data as input to generate a predicted inventory demand for the set of POS terminal devices for the geographic region. The machine-learning model can undergo a supervised training process where the model parameters are adjusted to minimize the prediction error across multiple training examples. For example, the machine-learning model can process historical demand data for mobile POS terminals in a European region from the previous 24 months, generate predictions for the subsequent 3 months, and compare the predictions with actual demand values to calculate a loss function such as mean squared error or mean absolute percentage error. In another example, the machine-learning model can be trained on historical fulfillment data for countertop POS terminals in a North American region, where the model initially predicts quarterly demand with a 15% error rate, and after multiple training iterations with backpropagation, the error rate decreases to 7%, demonstrating improved forecast accuracy. The machine-learning model can be updated based on a loss between the predicted inventory demand and actual inventory demand. In some implementations, the machine-learning model can employ gradient descent optimization techniques to iteratively adjust the model weights in the direction that reduces the loss function. The machine-learning model can incorporate cross-validation techniques during training, where the historical data can be divided into multiple subsets to evaluate model performance across different time periods and prevent overfitting to specific demand patterns.

The forecasted inventory demand generated by the machine-learning model can comprise a probabilistic distribution, providing a range of possible demand values with associated probabilities rather than a single point estimate. In some implementations, the probabilistic distribution can be represented as a discrete probability mass function, where specific demand quantities are associated with corresponding probability values. For example, the machine-learning model may generate a forecast indicating that the demand for mobile POS terminals in a European region has a 30% probability of being between 1,000 and 1,200 units, a 45% probability of being between 1,200 and 1,400 units, and a 25% probability of being between 1,400 and 1,600 units for the upcoming quarter. In some implementations, the probabilistic distribution can be represented as a continuous probability density function characterized by statistical parameters such as mean and standard deviation. For example, the machine-learning model may output a normal distribution with a mean of 2,500 units and a standard deviation of 200 units for the forecasted demand of countertop POS terminals in a North American region over the next six months. The use of probabilistic distributions in the forecasted inventory demand can allow the system to account for uncertainty in future demand patterns and provide a more comprehensive view of potential inventory instances.

The forecasted inventory demand can comprise forecasted inventory demands for a plurality of future time periods. In some implementations, the machine-learning model can generate separate demand forecasts for multiple time horizons, such as daily, weekly, monthly, or quarterly predictions. For example, the machine-learning model can output a series of monthly forecasts for mobile POS terminals in a European region, providing distinct demand estimates for each of the next 12 months to capture seasonal variations and long-term trends. In another example, the machine-learning model can generate weekly demand forecasts for countertop POS terminals in a North American region for the next 26 weeks, allowing for more granular inventory planning and procurement scheduling. The forecasted inventory demands for multiple future time periods can include confidence intervals or probability distributions for each time period, enabling the system to account for varying levels of uncertainty across different forecast horizons. In some implementations, the machine-learning model can adjust the granularity of the forecasts based on the characteristics of the geographic region or POS terminal device type, such as providing daily forecasts for high-volume urban areas and weekly forecasts for lower-volume rural regions.

At operation 330, the forecasted inventory demand can be allocated among the set of POS terminal devices based on historical device ratios from the historical POS terminal inventory data. The allocation may be performed by applying calculated distribution percentages to the aggregate demand forecast. In some implementations, weighted averaging techniques can be used to give greater importance to more recent historical data when determining the allocation ratios. For example, the forecasted demand of 5,000 total POS terminal devices for a European region may be allocated as 60% to countertop terminals (3,000 units), 25% to mobile terminals (1,250 units), and 15% to integrated terminals (750 units) based on historical deployment patterns. In another example, the allocation for a North American region may be adjusted based on seasonal factors, with a higher percentage allocated to mobile POS terminals during holiday shopping periods compared to non-peak periods.

At operation 340, a set of demand instances can be simulated based on current inventory levels, the allocated forecasted inventory demand, and inventory lead times for the set of POS terminal devices. The simulation may involve generating multiple possible demand trajectories using techniques such as Monte Carlo simulations or instance tree analysis. In some implementations, the simulated instances can incorporate variability in both demand patterns and supply chain conditions. For example, 1,000 demand instances may be simulated for mobile POS terminals in a European region, each representing a possible monthly demand pattern over a 12-month horizon. In another example, 500 instances may be generated for countertop POS terminals in a North American region, incorporating both demand fluctuations and potential variations in lead times from different suppliers. The lead times may represent a time between submitting an order for electronic devices and receiving the electronic devices. This time between order submission and delivery can be referred to as "delivery latency." Thus, the lead times can be referred to as "delivery latency."

At operation 350, a set of losses corresponding to the set of demand instances can be calculated. The losses may represent potential costs or risks associated with each simulated instance, such as stockout penalties or excess inventory carrying costs. In some implementations, different types of losses can be assigned different weights based on business priorities and operational constraints. For example, higher loss values may be calculated for inventory shortages of critical POS terminal devices during peak business periods compared to excess inventory of less critical devices during slower periods. In another example, procurement shortfall losses may be computed based on the difference between required inventory levels to maintain minimum service thresholds and the actual inventory levels achievable within budget constraints.

In some implementations, calculating the set of losses corresponding to the set of demand instances can include calculating procurement shortfall losses based on budget limits and minimum service thresholds. The procurement shortfall losses may be computed by determining the difference between the required inventory levels needed to maintain minimum service thresholds and the actual inventory levels that can be achieved within the budget constraints. For example, the system can calculate that a European region requires at least 1,000 mobile POS terminals to maintain a 98% service level threshold, but the current budget limit allows for the procurement of only 850 units, resulting in a procurement shortfall loss equivalent to the cost of business disruption from the 150-unit deficit. In some implementations, different weights can be applied to procurement shortfall losses based on the criticality of the geographic region or device type. For example, the system can assign a higher loss value to procurement shortfalls in high-revenue regions such as North America compared to lower-revenue regions, or apply a higher penalty factor to shortfalls in countertop POS terminals that process a majority of transactions compared to mobile POS terminals that serve as backups. The calculated procurement shortfall losses can be incorporated into the overall set of losses used to modify the allocated forecasted inventory demand, such that the modified demand balances service level requirements with budget constraints across different geographic regions and device types.

At operation 360, the allocated forecasted inventory demand can be modified based on the set of losses. The modification may involve applying adjustment factors to reduce expected losses in adverse instances while maintaining adequate inventory levels for normal operations. In some implementations, a conditional value at risk (CVaR) metric can be calculated based on the set of losses and used to inform the demand modifications. For example, the allocated demand for mobile POS terminals in a European region may be increased by 15% based on a high CVaR value indicating significant potential losses from stockouts during peak periods. In another example, the allocated demand for countertop POS terminals in a North American region may be reduced by 8% based on calculated losses showing excess inventory costs exceeding stockout costs in 70% of the simulated instances.

At operation 370, a data structure including a procurement plan for the set of POS terminal devices can be generated based on the modified allocated forecasted inventory demand. The data structure may specify the quantities, timing, and locations for ordering each type of POS terminal device. In some implementations, the procurement plan can be formatted as a time-phased order schedule that distributes orders across multiple periods to align with predicted demand patterns and lead times. For example, the procurement plan may schedule 30% of the total modified allocated demand for immediate ordering, 40% for ordering in 30 days, and the remaining 30% for ordering in 60 days, based on predicted inventory lead times and demand fluctuations. In another example, the plan may include specific order quantities for each of the next six months, with larger quantities scheduled during months preceding predicted seasonal demand increases.

The data structure including the procurement plan for the set of POS terminal devices can be generated by predicting future inventory levels based on the current inventory levels, the modified allocated forecasted inventory demand, and the inventory lead times. In some implementations, the prediction of future inventory levels can involve a time-series analysis that projects how the current inventory levels will change over time as new orders arrive and existing inventory is deployed. For example, the system can calculate that a current inventory of 500 mobile POS terminals, combined with a modified allocated forecasted demand of 100 units per week and an inventory lead time of 3 weeks, will result in a projected inventory level of 200 units after 5 weeks, accounting for both incoming orders and expected depletion. In another example, the system can determine that for countertop POS terminals with a current inventory of 1000 units, a modified allocated forecasted demand of 150 units per month, and a variable lead time ranging from 2 to 4 weeks, the projected inventory levels may fluctuate between 550 and 850 units over the next quarter, depending on the actual lead times experienced. The prediction of future inventory levels can incorporate various factors such as seasonality, historical demand patterns, and supply chain variability to provide a more accurate projection of inventory positions over time. In some implementations, the system can use machine learning algorithms to refine these predictions based on observed discrepancies between forecasted and actual inventory levels, continuously improving the accuracy of future projections.

The data structure can be an execution action data structure including procurement actions (also referred to herein as delivery actions) for obtaining the POS terminal devices. The execution action data structure can include human-executed procurement actions and/or machine-executed procurement actions (e.g., computer-executed actions). The procurement actions can include submitting orders using an API, requesting a predicted lead time for the electronic devices, and/or requesting updates on previously-submitted orders.

A delivery machine-learning model (e.g., the delivery machine-learning model 250 of FIG. 2A) can be trained to generate the inventory lead times. The delivery machine-learning model can obtain training fulfillment times for the set of POS terminal devices and execute using the training fulfillment times as input to generate predicted inventory lead times for the set of POS terminal devices. In some implementations, the delivery machine-learning model can process historical fulfillment data from multiple suppliers and logistics providers to learn patterns in delivery timeframes across different geographic regions and device types. For example, the delivery machine-learning model can analyze past shipping records for mobile POS terminals in a European region and determine that orders from a specific supplier typically arrive within 4-6 weeks during normal conditions but may extend to 6-8 weeks during peak retail seasons. In another example, the delivery machine-learning model can process customs clearance data for countertop POS terminals shipped to a North American region and predict that devices ordered from international suppliers will require 2-3 additional weeks for processing compared to devices from domestic suppliers. The delivery machine-learning model can be updated based on a loss between the predicted inventory lead times and actual inventory lead times. In some implementations, the delivery machine-learning model can undergo a supervised training process where the model parameters are adjusted to minimize the prediction error across multiple training examples. For example, the delivery machine-learning model can process historical fulfillment data for mobile POS terminals in a European region from the previous 24 months, generate predictions for the subsequent 3 months, and compare the predictions with actual lead time values to calculate a loss function such as mean squared error or mean absolute percentage error. The delivery machine-learning model can employ gradient descent optimization techniques to iteratively adjust the model weights in the direction that reduces the loss function, such that the model performance improves over time.

At operation 380, POS terminal devices of the set of POS terminal devices can be autonomously procured according to the procurement plan. The autonomous procurement may involve transmitting electronic purchase orders to supplier systems without human intervention based on the quantities, timing, and specifications defined in the data structure containing the procurement plan. In some implementations, the autonomous procurement can include generating API calls to supplier ordering systems with structured JSON payloads containing order details. For example, an API call may be automatically generated to order 500 mobile POS terminals for a European region, including quantity, delivery address, and requested fulfillment date. In another example, recurring procurement actions may be scheduled for countertop POS terminals in a North American region, such that orders are automatically placed when inventory levels are projected to reach predetermined thresholds.

Non-Limiting Example

In a specific implementation, a financial services company operates a network of retail locations across multiple countries in Europe and North America, each requiring different types of POS terminal devices to process customer transactions. The company maintains an inventory management system that tracks historical demand data for three primary device types: countertop terminals for traditional checkout stations, mobile terminals for customer-facing transactions, and integrated terminals for self-service kiosks.

The system obtains historical POS terminal demand data spanning the previous 36 months from multiple data sources, including transaction logs from 2,500 retail locations, supplier delivery records, maintenance schedules, and regional business growth metrics. The data aggregation engine preprocesses this raw data by removing duplicate entries, standardizing date formats across different regional systems, and filtering out anomalous demand spikes caused by one-time promotional events. The preprocessing operation consolidates daily transaction volumes into weekly demand figures and enriches the dataset by incorporating regional economic indicators such as retail sales indices and consumer spending patterns.

The forecasting machine-learning model, implemented as a gradient boosting algorithm, processes the consolidated historical demand data to generate country-level forecasted inventory demand for each geographic region. For the United Kingdom region, the model generates a probabilistic distribution indicating a 65% probability that total POS terminal demand will fall between 4,200 and 4,800 units for the upcoming quarter, with monthly forecasts showing peak demand in November due to holiday shopping patterns. The model incorporates seasonal variations by identifying that demand typically increases by 25% during the fourth quarter compared to the annual average.

The allocation engine distributes the country-level forecast among the three device types based on historical device ratios calculated from the previous 18 months of deployment data. For the United Kingdom region, the allocation engine applies ratios of 60% for countertop terminals, 30% for mobile terminals, and 10% for integrated terminals to the forecasted demand of 4,500 units, resulting in allocated quantities of 2,700 countertop terminals, 1,350 mobile terminals, and 450 integrated terminals.

The risk adjustment engine simulates 10,000 demand instances using Monte Carlo techniques, incorporating current inventory levels of 800 countertop terminals, 400 mobile terminals, and 150 integrated terminals. Each simulation accounts for variable lead times ranging from 3 to 8 weeks depending on supplier location and device complexity. The engine calculates multiple loss types for each instance, including stockout penalties of $500 per day per missing terminal, excess inventory carrying costs of $50 per terminal per month, and procurement shortfall losses based on maintaining a 95% service level threshold.

The conditional value at risk calculation identifies that the worst 5% of simulated instances result in average losses of $125,000 for the United Kingdom region, primarily due to stockouts of countertop terminals during peak demand periods. Based on this analysis, the risk adjustment engine modifies the allocated forecasted demand by increasing countertop terminal quantities by 12% to 3,024 units, reducing mobile terminal quantities by 5% to 1,283 units, and maintaining integrated terminal quantities at 450 units.

The delivery machine-learning model, trained on 24 months of historical fulfillment data from five primary suppliers, predicts lead times for each device type and supplier combination. The model determines that countertop terminals from the primary European supplier have a 70% probability of arriving within 4 weeks, while mobile terminals from an Asian supplier require 6-8 weeks with 80% confidence. The model incorporates seasonal shipping delays, predicting that lead times will extend by an additional 1-2 weeks during the November-December period due to increased logistics volume.

The system generates a procurement plan structured as a time-phased order schedule spanning six months. The plan schedules immediate orders for 1,500 countertop terminals to address current inventory shortfalls, followed by orders for 800 countertop terminals in 30 days and 724 countertop terminals in 60 days to align with predicted demand patterns. Mobile terminal orders are distributed as 600 units immediately, 400 units in 45 days, and 283 units in 75 days to account for longer lead times. The procurement plan includes supplier-specific details, with 70% of countertop terminals sourced from the European supplier and 30% from a North American supplier to diversify supply chain risk.

The autonomous procurement system executes the plan by transmitting structured purchase orders to supplier application programming interfaces without human intervention. The system generates JSON payloads containing order quantities, delivery addresses for regional distribution centers, requested fulfillment dates, and priority levels for each device type. For example, the system automatically places an order for 1,050 countertop terminals with the European supplier, specifying delivery to the London distribution center within 28 days and including expedited shipping instructions for 200 units to address immediate inventory needs.

The technical advantages of this implementation include a 35% reduction in inventory carrying costs compared to traditional static buffer approaches, achieved through precise demand forecasting and risk-based optimization without human input or intervention. The probabilistic forecasting approach enables the system to maintain 98.5% service levels while reducing safety stock requirements by 20%. The automated procurement process eliminates manual planning delays, reducing procurement cycle times from 2 weeks to 3 days and enabling rapid response to demand fluctuations. The integration of multiple machine-learning models provides forecast accuracy improvements compared to historical average methods, while the conditional value at risk optimization reduces worst-case instance losses through proactive inventory positioning.

Computing Environment

Figure 4:
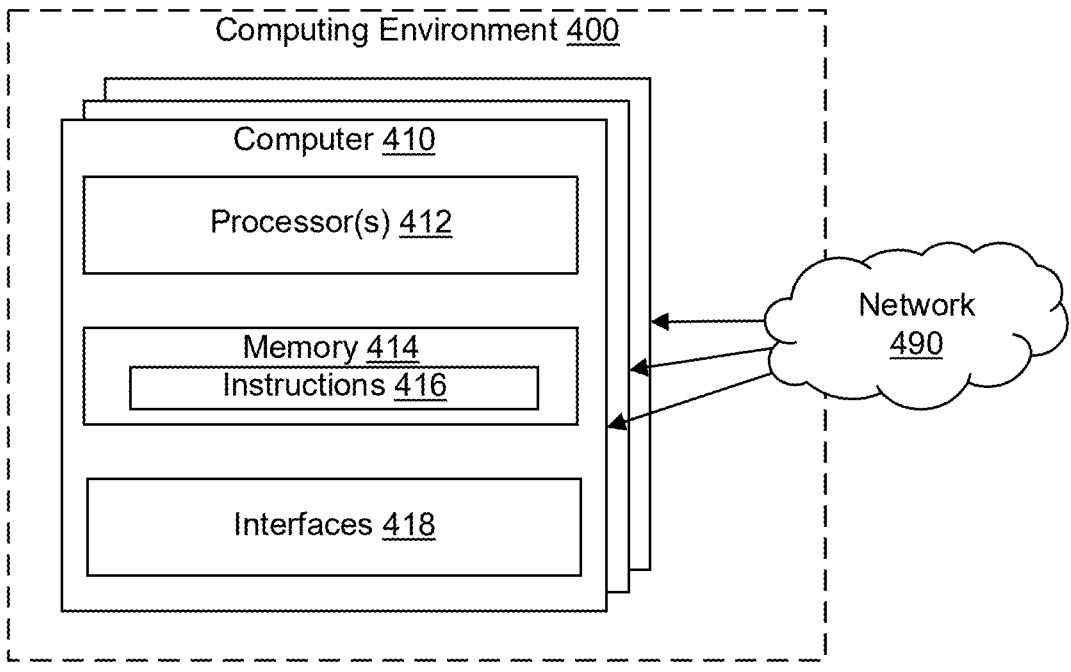
FIG. 4 discloses a computing environment in which aspects of the present disclosure may be implemented, in accordance with an implementation.

FIG. 4 discloses a computing environment 400 in which aspects of the present disclosure may be implemented. A computing environment 400 is a set of one or more virtual or physical computers 410 that individually or in cooperation achieve tasks, such as implementing one or more aspects described herein. The computers 410 have components that cooperate to cause output based on input. Example computers 410 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 400 includes at least one physical computer.

The computing environment 400 may specifically be used to implement one or more aspects described herein. In some examples, one or more of the computers 410 may be implemented as a user device, such as a mobile device, and others of the computers 410 may be used to implement aspects of a machine learning framework useable to train and deploy models exposed to the mobile device or provide other functionality, such as through exposed application programming interfaces.

The computing environment 400 can be arranged in any of a variety of ways. The computers 410 can be local to or remote from other computers 410 of the environment 400. The computing environment 400 can include computers 410 arranged according to client-server models, peer-to-peer models, edge computing models, other models, or combinations thereof.

In many examples, the computers 410 are communicatively coupled with devices internal or external to the computing environment 400 via a network 490. The network 490 is a set of devices that facilitate communication from a sender to a destination, such as by implementing communication protocols. Example networks 490 include local area networks, wide area networks, intranets, or the Internet.

In some implementations, computers 410 can be general-purpose computing devices (e.g., consumer computing devices). In some instances, via hardware or software configuration, computers 410 can be special purpose computing devices, such as servers able to practically handle large amounts of client traffic, machine learning devices able to practically train machine-learning models, data stores able to practically store and respond to requests for large amounts of data, other special purposes computers, or combinations thereof. The relative differences in capabilities of different kinds of computing devices can result in certain devices specializing in certain tasks. For instance, a machine-learning model may be trained on a powerful computing device and then stored on a relatively lower powered device for use.

Many example computers 410 include one or more processors 412, memory 414, and one or more interfaces 418. Such components can be virtual, physical, or combinations thereof.

The one or more processors 412 are components that execute instructions, such as instructions that obtain data, process the data, and provide output based on the processing. The one or more processors 412 often obtain instructions and data stored in the memory 414. The one or more processors 412 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 412 include at least one physical processor implemented as an electrical circuit. Example providers processors 412 include INTEL, AMD, QUALCOMM, TEXAS INSTRUMENTS, and APPLE.

The memory 414 is a collection of components configured to store instructions 416 and data for later retrieval and use. The instructions 416 can, when executed by the one or more processors 412, cause execution of one or more operations that implement aspects described herein. In many examples, the memory 414 is a non-transitory computer-readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 414 can store information encoded in transient signals.

The one or more interfaces 418 are components that facilitate receiving input from and providing output to something external to the computer 410, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 418 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 418 can facilitate connection of the computing environment 400 to a network 490.

The computers 410 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 5:
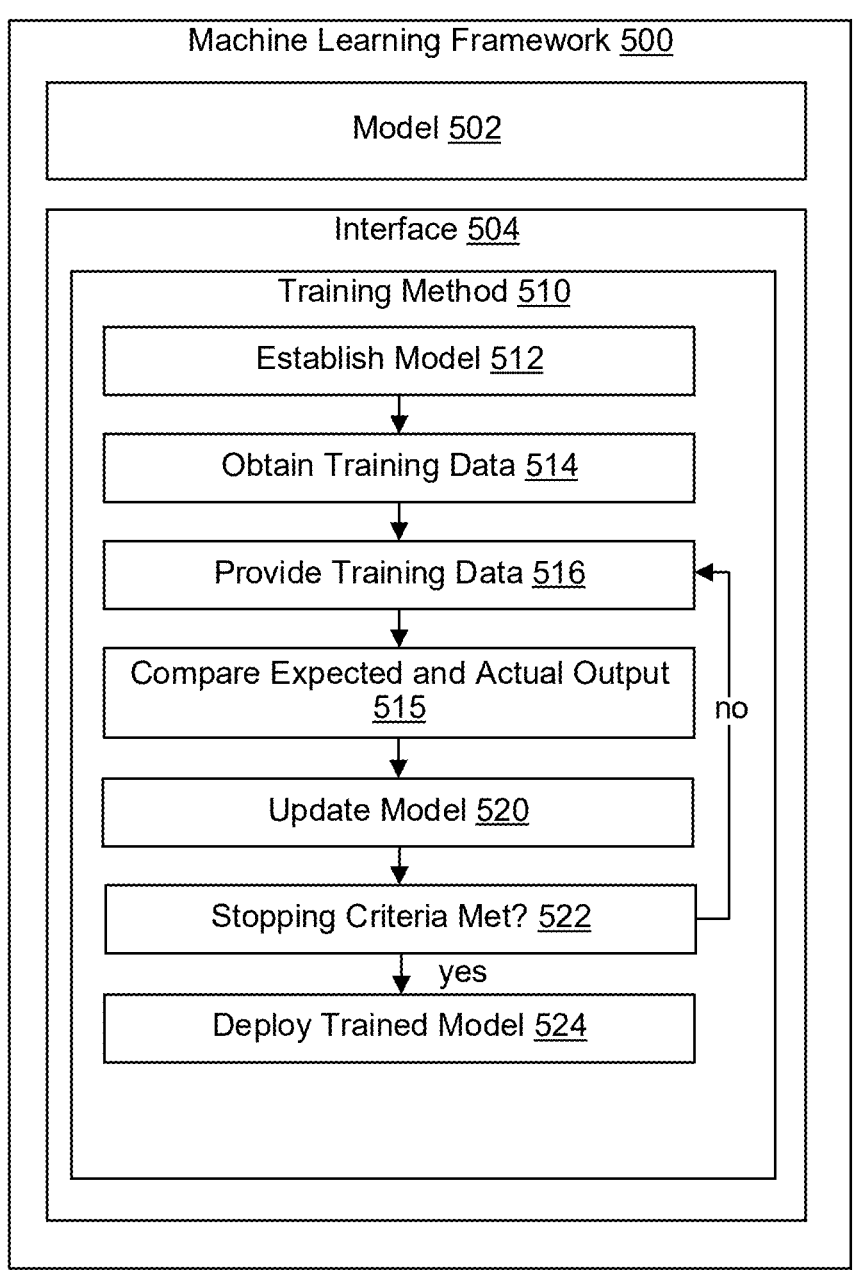

FIG. 5 illustrates an example machine learning framework 500 that techniques described herein may benefit from. A machine learning framework 500 is a collection of software and data that implements artificial intelligence trained to provide output, such as predictive data, based on input. Examples of artificial intelligence that can be implemented with machine learning ways include neural networks (including recurrent neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. Machine learning frameworks 500 or components thereof are often built or refined from existing frameworks, such as TENSORFLOW by GOOGLE, INC. or PYTORCH by the PYTORCH community.

The machine learning framework 500 can include one or more models 502 that are the structured representation of learning and an interface 504 that supports use of the model 502.

The model 502 can take any of a variety of forms. In many examples, the model 502 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 502 can include a representation of memory (e.g., providing long short-term memory functionality). Where the set includes more than one model 502, the models 502 can be linked, cooperate, or compete to provide output.

The interface 504 can include software procedures (e.g., defined in a library) that facilitate the use of the model 502, such as by providing a way to establish and interact with the model 502. For instance, the software procedures can include software for receiving input, preparing input for use (e.g., by performing vector embedding, such as using Word2Vec, BERT, or another technique), processing the input with the model 502, providing output, training the model 502, performing inference with the model 502, fine tuning the model 502, other procedures, or combinations thereof.

In an example implementation, interface 504 can be used to facilitate a training method 510 that can include operation 512. Operation 512 includes establishing a model 502, such as initializing a model 502. The establishing can include setting up the model 502 for further use (e.g., by training or fine tuning). The model 502 can be initialized with values. In examples, the model 502 can be pretrained. Operation 514 can follow operation 512. Operation 514 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 502. Operation 516 can follow operation 514. Operation 516 includes providing a portion of the training data to the model 502. This can include providing the training data in a format usable by the model 502. The framework 500 (e.g., via the interface 504) can cause the model 502 to produce an output based on the input. Operation 515 can follow operation 516. Operation 515 includes comparing the expected output with the actual output. In an example, this can include applying a loss function to determine the difference between expected and actual. This value can be used to determine how training is progressing. Operation 520 can follow operation 515. Operation 520 includes updating the model 502 based on the result of the comparison. This can take any of a variety of forms depending on the nature of the model 502. Where the model 502 includes weights, the weights can be modified to increase the likelihood that the model 502 will produce correct output given an input. Depending on the model 502, backpropagation or other techniques can be used to update the model 502. Operation 522 can follow operation 520. Operation 522 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 514. If the stopping criterion has been satisfied, the flow can move to operation 522. Operation 522 includes deploying the trained model 502 for use in production, such as providing the trained model 502 with real-world input data and produce output data used in a real-world process. The model 502 can be stored in memory 414 of at least one computer 410, or distributed across memories of two or more such computers 410 for production of output data (e.g., predictive data).

Application of Techniques

Techniques herein may be applicable to improving technological processes of a financial institution, such as technological aspects of actions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine-learning model with a diverse set of training data. Further, the policy can encourage testing for, and correcting undesirable bias embodied in the machine-learning model. The machine-learning model can further be aligned such that the machine-learning model tends to produce output consistent with a predetermined morality. Where machine-learning models are used in relation to a process that makes decisions affecting individuals, the machine-learning model can be configured to be explainable such that the reasons behind the decision can be known or determinable. The machine-learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method, comprising:

obtaining electronic device demand data from inventory management systems and supplier databases for a plurality of point-of-sale (POS) terminal devices deployed across geographic regions, wherein the electronic device demand data is obtained by merging data from disparate sources with different formats and structures into a unified dataset with consistent fields and metrics formatted for machine-learning analysis;

executing a machine-learning model using as input the unified dataset of the electronic device demand data to generate a demand prediction for a set of electronic devices for a region;

allocating the demand prediction among the set of electronic devices based on device ratios from the electronic device demand data;

simulating a set of demand instances based on the unified dataset, current device levels stored in an inventory database, the allocated demand prediction, and delivery latency for the set of electronic devices;

calculating a set of losses corresponding to the set of demand instances, wherein calculating the set of losses includes calculating shortfall losses based on capacity limits and minimum service thresholds;

modifying the allocated demand prediction based on the set of losses;

generating, by one or more processors, a data structure including an execution action data structure formatted as a structured JSON object for supplier application programming interface (API) calls for the set of electronic devices based on the modified allocated demand prediction; and autonomously transmitting the execution action data structure over a network to supplier systems to initiate procurement orders for the set of electronic devices according to the modified allocated demand prediction.

2. The method of claim 1, further comprising autonomously executing delivery actions for electronic devices of the set of electronic devices according to the execution action data structure.

3. The method of claim 1, further comprising:

obtaining raw data from multiple data sources; and preprocessing the raw data to generate the electronic device demand data.

4. The method of claim 1, wherein generating the data structure including the execution action data structure for the set of electronic devices includes predicting future device levels based on the current device levels, the modified allocated demand prediction, and the delivery latency.

5. The method of claim 1, further comprising:

obtaining training delivery times for the set of electronic devices;

executing a delivery machine-learning model using as input the training delivery times for the set of electronic devices to generate predicted delivery latency for the set of electronic devices;

updating the delivery machine-learning model based on a loss between the predicted delivery latency and actual delivery latency; and executing the delivery machine-learning model using as input delivery times to generate the delivery latency for the set of electronic devices.

6. The method of claim 1, further comprising:

obtaining training electronic device demand data for the set of electronic devices;

executing the machine-learning model using as input the training electronic device demand data for the set of electronic devices to generate a predicted demand for the set of electronic devices for the region; and updating the machine-learning model based on a loss between the predicted demand and actual demand.

7. The method of claim 1, wherein the demand prediction comprises a probabilistic distribution.

8. The method of claim 1, wherein the demand prediction comprises demand predictions for a plurality of future time periods.

9. The method of claim 1, further comprising calculating a conditional value at risk (CVaR) based on the set of losses, and wherein generating the data structure is based on the calculated CVaR.

10. A non-transitory, computer-readable medium including instructions which, when executed by one or more processors, cause the one or more processors to:

obtain electronic device demand data from inventory management systems and supplier databases for a plurality of point-of-sale (POS) terminal devices deployed across geographic regions wherein the electronic device demand data is obtained by merging data from disparate sources with different formats and structures into a unified dataset with consistent fields and metrics formatted for machine-learning analysis;

execute a machine-learning model using as input the unified dataset of the electronic device demand data to generate a demand prediction for a set of electronic devices for a region;

allocate the demand prediction among the set of electronic devices based on device ratios from the electronic device demand data;

simulate a set of demand instances based on the unified dataset, current device levels stored in an inventory database, the allocated demand prediction, and delivery latency for the set of electronic devices;

calculate a set of losses corresponding to the set of demand instances, wherein calculating the set of losses includes calculating shortfall losses based on capacity limits and minimum service thresholds;

modify the allocated demand prediction based on the set of losses; and generate a data structure including an execution action data structure formatted as a structured JSON object for supplier application programming interface (API) calls for the set of electronic devices based on the modified allocated demand prediction; and autonomously transmit the execution action data structure over a network to supplier systems to initiate procurement orders for the set of electronic devices according to the modified allocated demand prediction.

11. The non-transitory, computer-readable medium of claim 10, wherein the instructions cause the one or more processors to autonomously execute delivery actions for electronic devices of the set of electronic devices according to the execution action data structure.

12. The non-transitory, computer-readable medium of claim 10, wherein the instructions cause the one or more processors to:

obtain raw data from multiple data sources; and preprocess the raw data to generate the electronic device demand data.

13. The non-transitory, computer-readable medium of claim 10, wherein the instructions cause the one or more processors to generate the data structure including the execution action data structure for the set of electronic devices by predicting future device levels based on the current device levels, the modified allocated demand prediction, and the delivery latency.

14. The non-transitory, computer-readable medium of claim 10, wherein the instructions cause the one or more processors to:

obtain training delivery times for the set of electronic devices;

execute a delivery machine-learning model using as input the training delivery times for the set of electronic devices to generate predicted delivery latency for the set of electronic devices;

update the delivery machine-learning model based on a loss between the predicted delivery latency and actual delivery latency; and execute the delivery machine-learning model using as input delivery times to generate the delivery latency for the set of electronic devices.

15. The non-transitory, computer-readable medium of claim 10, wherein the instructions cause the one or more processors to:

obtain training electronic device demand data for the set of electronic devices;

execute the machine-learning model using as input the training electronic device demand data for the set of electronic devices to generate a predicted demand for the set of electronic devices for the region; and update the machine-learning model based on a loss between the predicted demand and actual demand.

16. The non-transitory, computer-readable medium of claim 10, wherein the demand prediction comprises a probabilistic distribution.

17. The non-transitory, computer-readable medium of claim 10, wherein the demand prediction comprises demand predictions for a plurality of future time periods.

18. The non-transitory, computer-readable medium of claim 10, wherein the instructions cause the one or more processors to calculate a conditional value at risk (CVaR) based on the set of losses, and wherein the instructions cause the one or more processors to generate the data structure based on the calculated CVaR.

\* \* \* \* \*